US012677343B2

(12) United States Patent
Khare et al.

(10) Patent No.: US 12,677,343 B2
(45) Date of Patent: Jul. 7, 2026

(54) APPARATUS, METHODS, AND COMPUTER PROGRAMS

(71) Applicant: NOKIA TECHNOLOGIES OY, Espoo (FI)

(72) Inventors: Saurabh Khare, Bangalore (IN); Pallab Gupta, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 493 days.

(21) Appl. No.: 18/097,752

(22) Filed: Jan. 17, 2023

(65) Prior Publication Data

US 2023/0254931 A1    Aug. 10, 2023

(30) Foreign Application Priority Data

Jan. 17, 2022    (IN) .............................. 202241002733

(51) Int. Cl.
*H04W 76/25*    (2018.01)
*H04B 7/185*    (2006.01)
*H04W 84/18*    (2009.01)

(52) U.S. Cl.
CPC ........ *H04W 76/25* (2018.02); *H04B 7/18504* (2013.01); *H04W 84/18* (2013.01)

(58) Field of Classification Search
CPC ..... H04W 76/25; H04W 84/18; H04W 76/19; H04W 8/12; H04W 12/72; H04B 7/18504; H04B 7/18506; H04L 67/52; G08G 5/30; G08G 5/34
See application file for complete search history.

(56) References Cited

U.S. PATENT DOCUMENTS

| | | | | |
|---|---|---|---|---|
| 10,690,781 B2* | 6/2020 | Kosseifi | ................ | B60L 53/305 |
| 11,184,083 B2* | 11/2021 | De Rosa | .................. | G08G 5/34 |
| 11,564,149 B2* | 1/2023 | Vivanco | .............. | H04W 36/328 |
| 11,930,383 B2* | 3/2024 | Cirkic | ..................... | H04W 8/22 |
| 2020/0096594 A1* | 3/2020 | Virtej | ..................... | H04L 67/52 |
| 2020/0266903 A1* | 8/2020 | De Rosa | ............ | H04B 7/18506 |
| 2022/0051570 A1* | 2/2022 | Zhang | .................. | H04W 12/72 |
| 2022/0159550 A1* | 5/2022 | Vivanco | .............. | H04W 36/328 |
| 2023/0121609 A1* | 4/2023 | Abhigyan | ................ | G08G 5/57 |
| | | | | 701/3 |

(Continued)

FOREIGN PATENT DOCUMENTS

| | | | | | |
|---|---|---|---|---|---|
| CN | 108781379 A | * | 11/2018 | ...... | H04W 36/00835 |
| CN | 115136222 A | * | 9/2022 | ........... | H04W 12/06 |

(Continued)

OTHER PUBLICATIONS

Chowdhury, Mostafa Zaman, 6G Wireless Communication System: Applications, Requirements, Technologies, Challenges, and Research Directions, IEEE, Jun. 2020 (Year: 2020).*

(Continued)

*Primary Examiner* — Ayaz R Sheikh
*Assistant Examiner* — Louis Samara
(74) *Attorney, Agent, or Firm* — Nokia Technologies Oy

(57) ABSTRACT

There is provided a method for an apparatus, the apparatus, and computer program for the apparatus, that causes the apparatus to: maintaining a connection to a first network; receiving signalling indicating that the connection to the first network will be lost; and responding to the received signalling with an indication to proceed with the connection loss.

16 Claims, 15 Drawing Sheets

(56)         References Cited

U.S. PATENT DOCUMENTS

2023/0156554 A1* 5/2023 Ferdi ........................ G08G 5/26
                                                            370/331

FOREIGN PATENT DOCUMENTS

| | | | | | |
|---|---|---|---|---|---|
| CN | 116074908 A | * | 5/2023 | ........ | H04W 36/0033 |
| ES | 2976194 T3 | * | 7/2024 | .............. | G08G 5/30 |
| WO | WO-2022264090 A1 | * | 12/2022 | ............ | H04W 24/08 |

OTHER PUBLICATIONS

A Tutorial on UAVs for Wireless Networks: Application, Challenges, and Open Problems, Mozzaffari, IEEE communications, 2019 (Year: 2019).*

3GPP TS 23.256 V17.1.0 (Dec. 2021), Technical Specification, 3rd Generation Partnership Project; Technical Specification Group Services and System Aspects; Support of Uncrewed Aerial Systems (UAS) connectivity, Identification and tracking; Stage 2 (Release 17), Dec. 2021.

3GPP TS 22.125 V17.4.0 (Dec. 2021), Technical Specification, 3rd Generation Partnership Project; Technical Specification Group Services and System Aspects; Uncrewed Aerial System (UAS) support in 3GPP; Stage 1; Release 17, Dec. 2021.

3GPP TS 23.502 V17.3.0 (Dec. 2021), Technical Specification, 3rd Generation Partnership Project; Technical Specification Group Services and System Aspects; Procedures for the 5G System (5GS); Stage 2 (Release 17), Dec. 2021.

\* cited by examiner

| 122' | Nudr |
| 124' | Nnef |
| 112' | Namf |
| 126' | Nnwdaf |
| 114' | Nsmf |
| 120' | N4 |
| 108' | Naf |
| 130' | Npcf |
| 132' | Nchf |

APPARATUS, METHODS, AND COMPUTER PROGRAMS

CROSS REFERENCE TO RELATED APPLICATION

This application claims the benefit of Indian Patent Application number 202241002733, filed Jan. 17, 2022. The entire content of the above-referenced application is hereby incorporated by reference.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

There is a need to provide control systems which enable a communications service provider (CSP) to control and optimise a complex network of communications system elements.

One of current approaches being employed is closed-loop automation and machine learning which can be built into self-organizing networks (SON) enabling an operator to automatically optimize every cell in the radio access network.

SUMMARY

According to a first aspect, there is provided an apparatus for a first network function located in a first network, the apparatus comprising means for: determining that a trigger event has occurred for causing a user equipment associated with an unmanned aerial vehicle to lose connectivity to the first network; causing at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle; causing a timer to be initiated in response to causing at least one of the user equipment and the unmanned aerial vehicle to be signalled; and delaying proceeding with causing the user equipment to lose said connectivity to the first network until at least one of the following has occurred: receiving signalling indicating that the network function may proceed with causing the user equipment to lose connectivity to the first network; and/or determining that said first timer has expired.

Said means for causing at least one of the user equipment and/or the unmanned aerial vehicle and/or the unmanned aerial vehicle controller to be signalled a first indication may comprise means for signalling the user equipment using the first network.

Said means for causing at least one of the user equipment and the unmanned aerial vehicle and/or the unmanned aerial vehicle controller to be signalled a first indication may comprise means for signalling the user equipment indirectly through at least one second network function.

The at least one second network function may comprise at least one of: an access and mobility function, a network function, a network exposure function, an application function, an Unmanned Aerial Systems Service Supplier and/or a function associated with the unmanned aerial vehicle.

Said means for causing at least one of the user equipment and/or the unmanned aerial vehicle and/or the unmanned aerial vehicle controller to be signalled a first indication may comprise means for signalling at least one of: an identifier of the user equipment; an identifier of the unmanned aerial vehicle; and/or a value for an initial duration of the first timer.

Said means for receiving signalling indicating that the network function may proceed with causing the user equipment to lose connectivity to the first network may comprise means for: receiving signalling requesting that an initial duration of the first timer be extended; and extending the duration of the first timer to an extended duration.

Said means for receiving signalling indicating that the network function may proceed with causing the user equipment to lose connectivity to the first network may comprise means for: receiving signalling indicating that the unmanned aerial vehicle has changed its flight path and/or landed on the ground.

Said first indication may indicate: that a session associated with the user equipment will be released; and/or that the user equipment will be deregistered with the first network.

The first network function may comprise an access and mobility function or a session management function.

According to a second aspect, there is provided an apparatus for a second network function, the apparatus comprising means for: receiving, from a first network function located in a first network, a first indication indicating that a user equipment associated with an unmanned aerial vehicle will lose connectivity to the first network; causing at least one of the user equipment and the unmanned aerial vehicle to be signalled a second indication that the user equipment will lose said connectivity to the first network; and responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further comprise means for: signalling, to the first network function, a request to extend the duration of the first timer.

Said means for signalling an indication to proceed with the connection loss may comprise means for: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

When the second network function is a network exposure function, the means for causing at least one of the user equipment and/or the unmanned aerial vehicle and/or the unmanned aerial vehicle controller to be signalled the second indication may comprise means for: identifying an access and mobility function currently serving the user equipment and/or a user equipment associated with a controller of the unmanned aerial vehicle; and causing the identified access and mobility function to signal the second indication to the user equipment.

Said first indication may indicate: that a session associated with the user equipment will be released; and/or that the user equipment will be deregistered with the first network.

The first network function may comprise an access and mobility function or a session management function.

According to a third aspect, there is provided an apparatus for an unmanned aerial vehicle controller, the apparatus comprising means for: controlling at least one flight path of an unmanned aerial vehicle, the unmanned aerial vehicle being associated with a user equipment configured to maintain connectivity with a first network; receiving, from a first network function, a first indication indicating that the user equipment will lose said connectivity to the first network; and causing at least one of the user equipment and the unmanned aerial vehicle to be signalled a second indication that the user equipment will lose said connectivity to the first network; and responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further comprise means for: signalling, to the first network function, a request to extend the duration of the first timer.

Said means for signalling an indication to proceed with the connection loss may comprise means for: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

Said first indication may indicate: that a session associated with the user equipment will be released; and/or that the user equipment will be deregistered with the first network.

The first network function may comprise an access and mobility function or a session management function.

According to a fourth aspect, there is provided an apparatus comprising a user equipment and an unmanned aerial vehicle, the apparatus comprising means for: maintaining a connection to a first network; receiving signalling indicating that the connection to the first network will be lost; and responding to the received signalling with an indication to proceed with the connection loss.

The apparatus may further comprise means for causing the unmanned aerial vehicle to change its flight path in response to said signalling and/or for causing the user equipment and/or the unmanned aerial vehicle to perform signalling previously associated with the connectivity being lost using an alternative connection.

The means for receiving signalling indicating that the connection to the first network will be lost may comprise means for receiving an indication of an initial time when the first network will proceed with the connection loss.

The means for responding to the received signalling may comprise means for requesting that said initial time be delayed to a later time.

According to a fifth aspect, there is provided an apparatus for a first network function located in a first network, the apparatus comprising: at least one processor; and at least one memory comprising code that, when executed by the at least one processor, causes the apparatus to: determine that a trigger event has occurred for causing a user equipment associated with an unmanned aerial vehicle to lose connectivity to the first network; cause at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle; cause a timer to be initiated in response to causing at least one of the user equipment and the unmanned aerial vehicle to be signalled; and delay proceeding with causing the user equipment to lose said connectivity to the first network until at least one of the following has occurred: receiving signalling indicating that the network function may proceed with causing the user equipment to lose connectivity to the first network; and/or determining that said first timer has expired.

Said causing at least one of the user equipment and/or the unmanned aerial vehicle and/or the unmanned aerial vehicle controller to be signalled a first indication may comprise signalling the user equipment using the first network.

Said causing at least one of the user equipment and the unmanned aerial vehicle and/or the unmanned aerial vehicle controller to be signalled a first indication may comprise signalling the user equipment indirectly through at least one second network function.

The at least one second network function may comprise at least one of: an access and mobility function, a network function, a network exposure function, an application function, an Unmanned Aerial Systems Service Supplier and/or a function associated with the unmanned aerial vehicle.

Said causing at least one of the user equipment and/or the unmanned aerial vehicle and/or the unmanned aerial vehicle controller to be signalled a first indication may comprise signalling at least one of: an identifier of the user equipment; an identifier of the unmanned aerial vehicle; and/or a value for an initial duration of the first timer.

Said receiving signalling indicating that the network function may proceed with causing the user equipment to lose connectivity to the first network may comprise: receiving signalling requesting that an initial duration of the first timer be extended; and extending the duration of the first timer to an extended duration.

Said receiving signalling indicating that the network function may proceed with causing the user equipment to lose connectivity to the first network may comprise: receiving signalling indicating that the unmanned aerial vehicle has changed its flight path and/or landed on the ground.

Said first indication may indicate: that a session associated with the user equipment will be released; and/or that the user equipment will be deregistered with the first network.

The first network function may comprise an access and mobility function or a session management function.

According to a sixth aspect, there is provided an apparatus for a second network function, the apparatus comprising: at least one processor; and at least one memory comprising code that, when executed by the at least one processor, causes the apparatus to: receive, from a first network function located in a first network, a first indication indicating that a user equipment associated with an unmanned aerial vehicle will lose connectivity to the first network; cause at least one of the user equipment and the unmanned aerial vehicle to be signalled a second indication that the user equipment will lose said connectivity to the first network; and respond to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further be caused to: signal, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

When the second network function is a network exposure function, the causing at least one of the user equipment and/or the unmanned aerial vehicle and/or the unmanned aerial vehicle controller to be signalled the second indication may comprise: identifying an access and mobility function currently serving the user equipment and/or a user equipment associated with a controller of the unmanned aerial vehicle; and causing the identified access and mobility function to signal the second indication to the user equipment.

Said first indication may indicate: that a session associated with the user equipment will be released; and/or that the user equipment will be deregistered with the first network.

The first network function may comprise an access and mobility function or a session management function.

According to a seventh aspect, there is provided an apparatus for an unmanned aerial vehicle controller, the apparatus comprising: at least one processor; and at least one memory comprising code that, when executed by the at least one processor, causes the apparatus to: control at least one flight path of an unmanned aerial vehicle, the unmanned aerial vehicle being associated with a user equipment configured to maintain connectivity with a first network; receive, from a first network function, a first indication indicating that the user equipment will lose said connectivity to the first network; cause at least one of the user equipment and the unmanned aerial vehicle to be signalled a second indication that the user equipment will lose said connectivity to the first network; and respond to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further be caused to: signal, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

Said first indication may indicate: that a session associated with the user equipment will be released; and/or that the user equipment will be deregistered with the first network.

The first network function may comprise an access and mobility function or a session management function.

According to an eighth aspect, there is provided an apparatus comprising a user equipment and an unmanned aerial vehicle, the apparatus comprising: at least one processor; and at least one memory comprising code that, when executed by the at least one processor, causes the apparatus to: maintain a connection to a first network; receive signalling indicating that the connection to the first network will be lost; and respond to the received signalling with an indication to proceed with the connection loss.

The apparatus may further be caused to cause the unmanned aerial vehicle to change its flight path in response to said signalling and/or for causing the user equipment and/or the unmanned aerial vehicle to perform signalling previously associated with the connectivity being lost using an alternative connection.

The receiving signalling indicating that the connection to the first network will be lost may comprise receiving an indication of an initial time when the first network will proceed with the connection loss.

The responding to the received signalling may comprise requesting that said initial time be delayed to a later time.

According to a ninth aspect, there is provided a method for an apparatus for a first network function located in a first network, the method comprising: determining that a trigger event has occurred for causing a user equipment associated with an unmanned aerial vehicle to lose connectivity to the first network; causing at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle; causing a timer to be initiated in response to causing at least one of the user equipment and the unmanned aerial vehicle to be signalled; and delaying proceeding with causing the user equipment to lose said connectivity to the first network until at least one of the following has occurred: receiving signalling indicating that the network function may proceed with causing the user equipment to lose connectivity to the first network; and/or determining that said first timer has expired.

Said causing at least one of the user equipment and/or the unmanned aerial vehicle and/or the unmanned aerial vehicle controller to be signalled a first indication may comprise signalling the user equipment using the first network.

Said causing at least one of the user equipment and the unmanned aerial vehicle and/or the unmanned aerial vehicle controller to be signalled a first indication may comprise signalling the user equipment indirectly through at least one second network function.

The at least one second network function may comprise at least one of: an access and mobility function, a network function, a network exposure function, an application function, an Unmanned Aerial Systems Service Supplier and/or a function associated with the unmanned aerial vehicle.

Said causing at least one of the user equipment and/or the unmanned aerial vehicle and/or the unmanned aerial vehicle controller to be signalled a first indication may comprise signalling at least one of: an identifier of the user equipment; an identifier of the unmanned aerial vehicle; and/or a value for an initial duration of the first timer.

Said receiving signalling indicating that the network function may proceed with causing the user equipment to lose connectivity to the first network may comprise: receiving signalling requesting that an initial duration of the first timer be extended; and extending the duration of the first timer to an extended duration.

Said receiving signalling indicating that the network function may proceed with causing the user equipment to lose connectivity to the first network may comprise: receiving signalling indicating that the unmanned aerial vehicle has changed its flight path and/or landed on the ground.

Said first indication may indicate: that a session associated with the user equipment will be released; and/or that the user equipment will be deregistered with the first network.

The first network function may comprise an access and mobility function or a session management function.

According to a tenth aspect, there is provided a method for an apparatus for a second network function, the method comprising: receiving, from a first network function located in a first network, a first indication indicating that a user equipment associated with an unmanned aerial vehicle will lose connectivity to the first network; causing at least one of the user equipment and the unmanned aerial vehicle to be signalled a second indication that the user equipment will lose said connectivity to the first network; and responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the method may further comprise: signalling, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

When the second network function is a network exposure function, the causing at least one of the user equipment and/or the unmanned aerial vehicle and/or the unmanned aerial vehicle controller to be signalled the second indication may comprise: identifying an access and mobility function currently serving the user equipment and/or a user equipment associated with a controller of the unmanned aerial vehicle; and causing the identified access and mobility function to signal the second indication to the user equipment.

Said first indication may indicate: that a session associated with the user equipment will be released; and/or that the user equipment will be deregistered with the first network.

The first network function may comprise an access and mobility function or a session management function.

According to an eleventh aspect, there is provided a method for an apparatus for an unmanned aerial vehicle controller, the method comprising: controlling at least one flight path of an unmanned aerial vehicle, the unmanned aerial vehicle being associated with a user equipment configured to maintain connectivity with a first network; receiving, from a first network function, a first indication indicating that the user equipment will lose said connectivity to the first network; and causing at least one of the user equipment and the unmanned aerial vehicle to be signalled a second indication that the user equipment will lose said connectivity to the first network; and responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the method may further comprise: signalling, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

Said first indication may indicate: that a session associated with the user equipment will be released; and/or that the user equipment will be deregistered with the first network.

The first network function may comprise an access and mobility function or a session management function.

According to a twelfth aspect, there is provided a method for an apparatus comprising a user equipment and an unmanned aerial vehicle, the method comprising: maintaining a connection to a first network; receiving signalling indicating that the connection to the first network will be lost; and responding to the received signalling with an indication to proceed with the connection loss.

The method may further comprise causing the unmanned aerial vehicle to change its flight path in response to said signalling and/or for causing the user equipment and/or the unmanned aerial vehicle to perform signalling previously associated with the connectivity being lost using an alternative connection.

The receiving signalling indicating that the connection to the first network will be lost may comprise receiving an indication of an initial time when the first network will proceed with the connection loss.

The responding to the received signalling may comprise requesting that said initial time be delayed to a later time.

According to a thirteenth aspect, there is provided an apparatus for a first network function located in a first network, the apparatus comprising: determining circuitry for determining that a trigger event has occurred for causing a user equipment associated with an unmanned aerial vehicle to lose connectivity to the first network; causing circuitry for causing at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle; causing circuitry for causing a timer to be initiated in response to causing at least one of the user equipment and the unmanned aerial vehicle to be signalled; and delaying circuitry for delaying proceeding with causing the user equipment to lose said connectivity to the first network until at least one of the following has occurred: receiving signalling indicating that the network function may proceed with causing the user equipment to lose connectivity to the first network; and/or determining that said first timer has expired.

Said causing circuitry for causing at least one of the user equipment and/or the unmanned aerial vehicle and/or the unmanned aerial vehicle controller to be signalled a first indication may comprise signalling circuitry for signalling the user equipment using the first network.

Said causing circuitry for causing at least one of the user equipment and the unmanned aerial vehicle and/or the unmanned aerial vehicle controller to be signalled a first indication may comprise signalling circuitry for signalling the user equipment indirectly through at least one second network function.

The at least one second network function may comprise at least one of: an access and mobility function, a network function, a network exposure function, an application function, an Unmanned Aerial Systems Service Supplier and/or a function associated with the unmanned aerial vehicle.

Said causing circuitry for causing at least one of the user equipment and/or the unmanned aerial vehicle and/or the unmanned aerial vehicle controller to be signalled a first indication may comprise signalling circuitry for signalling at least one of: an identifier of the user equipment; an identifier of the unmanned aerial vehicle; and/or a value for an initial duration of the first timer.

Said receiving circuitry for receiving signalling indicating that the network function may proceed with causing the user equipment to lose connectivity to the first network may comprise: receiving circuitry for receiving signalling requesting that an initial duration of the first timer be extended; and extending circuitry for extending the duration of the first timer to an extended duration.

Said receiving circuitry for receiving signalling indicating that the network function may proceed with causing the user equipment to lose connectivity to the first network may comprise: receiving circuitry for receiving signalling indicating that the unmanned aerial vehicle has changed its flight path and/or landed on the ground.

Said first indication may indicate: that a session associated with the user equipment will be released; and/or that the user equipment will be deregistered with the first network.

The first network function may comprise an access and mobility function or a session management function.

According to a fourteenth aspect, there is provided an apparatus for a second network function, the apparatus comprising: receiving circuitry for receiving, from a first network function located in a first network, a first indication indicating that a user equipment associated with an unmanned aerial vehicle will lose connectivity to the first network; causing circuitry for causing at least one of the user equipment and the unmanned aerial vehicle to be signalled a second indication that the user equipment will lose said connectivity to the first network; and responding circuitry for responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further comprise: signalling circuitry for signalling, to the first network function, a request to extend the duration of the first timer.

Said signalling circuitry for signalling an indication to proceed with the connection loss may comprise: receiving circuitry for receiving a third indication that the unmanned aerial vehicle and/or the user equipment has taken at least one action in response to being notified of the loss of connectivity; and signalling circuitry for signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

When the second network function is a network exposure function, the causing circuitry for causing at least one of the user equipment and/or the unmanned aerial vehicle and/or the unmanned aerial vehicle controller to be signalled the second indication may comprise: identifying circuitry for identifying an access and mobility function currently serving the user equipment and/or a user equipment associated with a controller of the unmanned aerial vehicle; and causing circuitry for causing the identified access and mobility function to signal the second indication to the user equipment.

Said first indication may indicate: that a session associated with the user equipment will be released; and/or that the user equipment will be deregistered with the first network.

The first network function may comprise an access and mobility function or a session management function.

According to a fifteenth aspect, there is provided an apparatus for an unmanned aerial vehicle controller, the apparatus comprising: controlling circuitry for controlling at least one flight path of an unmanned aerial vehicle, the unmanned aerial vehicle being associated with a user equipment configured to maintain connectivity with a first network; receiving circuitry for receiving, from a first network function, a first indication indicating that the user equipment will lose said connectivity to the first network; causing circuitry for causing at least one of the user equipment and the unmanned aerial vehicle to be signalled a second indication that the user equipment will lose said connectivity to the first network; and responding circuitry for responding to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further comprise: signalling circuitry for signalling, to the first network function, a request to extend the duration of the first timer.

Said signalling circuitry for signalling an indication to proceed with the connection loss may comprise: receiving circuitry for receiving a third indication that the unmanned aerial vehicle and/or the user equipment has taken at least one action in response to being notified of the loss of connectivity; and signalling circuitry for signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

Said first indication may indicate: that a session associated with the user equipment will be released; and/or that the user equipment will be deregistered with the first network.

The first network function may comprise an access and mobility function or a session management function.

According to a sixteenth aspect, there is provided an apparatus comprising a user equipment and an unmanned aerial vehicle, the apparatus comprising: maintaining circuitry for maintaining a connection to a first network; receiving circuitry for receiving signalling indicating that the connection to the first network will be lost; and responding circuitry for responding to the received signalling with an indication to proceed with the connection loss.

The apparatus may further comprise causing circuitry for causing the unmanned aerial vehicle to change its flight path in response to said signalling and/or for causing the user equipment and/or the unmanned aerial vehicle to perform signalling previously associated with the connectivity being lost using an alternative connection.

The receiving circuitry for receiving signalling indicating that the connection to the first network will be lost may comprise receiving circuitry for receiving an indication of an initial time when the first network will proceed with the connection loss.

The responding circuitry for responding to the received signalling may comprise requesting circuitry for requesting that said initial time be delayed to a later time.

According to a seventeenth aspect, there is provided non-transitory computer readable medium comprising program instructions for causing an apparatus for a first network function located in a first network to perform at least the following: determine that a trigger event has occurred for causing a user equipment associated with an unmanned aerial vehicle to lose connectivity to the first network; cause at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle; cause a timer to be initiated in response to causing at least one of the user equipment and the unmanned aerial vehicle to be signalled; and delay proceeding with causing the user equipment to lose said connectivity to the first network until at least one of the following has occurred: receiving signalling indicating that the network function may proceed with causing the user equipment to lose connectivity to the first network; and/or determining that said first timer has expired.

Said causing at least one of the user equipment and/or the unmanned aerial vehicle and/or the unmanned aerial vehicle controller to be signalled a first indication may comprise signalling the user equipment using the first network.

Said causing at least one of the user equipment and the unmanned aerial vehicle and/or the unmanned aerial vehicle controller to be signalled a first indication may comprise signalling the user equipment indirectly through at least one second network function.

The at least one second network function may comprise at least one of: an access and mobility function, a network function, a network exposure function, an application function, an Unmanned Aerial Systems Service Supplier and/or a function associated with the unmanned aerial vehicle.

Said causing at least one of the user equipment and/or the unmanned aerial vehicle and/or the unmanned aerial vehicle controller to be signalled a first indication may comprise signalling at least one of: an identifier of the user equipment; an identifier of the unmanned aerial vehicle; and/or a value for an initial duration of the first timer.

Said receiving signalling indicating that the network function may proceed with causing the user equipment to lose connectivity to the first network may comprise: receiving signalling requesting that an initial duration of the first timer be extended; and extending the duration of the first timer to an extended duration.

Said receiving signalling indicating that the network function may proceed with causing the user equipment to lose connectivity to the first network may comprise: receiving signalling indicating that the unmanned aerial vehicle has changed its flight path and/or landed on the ground.

Said first indication may indicate: that a session associated with the user equipment will be released; and/or that the user equipment will be deregistered with the first network.

The first network function may comprise an access and mobility function or a session management function.

According to an eighteenth aspect, there is provided non-transitory computer readable medium comprising program instructions for causing an apparatus for a second network function to perform at least the following: receive, from a first network function located in a first network, a first indication indicating that a user equipment associated with an unmanned aerial vehicle will lose connectivity to the first network; cause at least one of the user equipment and the unmanned aerial vehicle to be signalled a second indication that the user equipment will lose said connectivity to the first network; and respond to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further be caused to: signal, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

When the second network function is a network exposure function, the causing at least one of the user equipment and/or the unmanned aerial vehicle and/or the unmanned aerial vehicle controller to be signalled the second indication may comprise: identifying an access and mobility function currently serving the user equipment and/or a user equipment associated with a controller of the unmanned aerial vehicle; and causing the identified access and mobility function to signal the second indication to the user equipment.

Said first indication may indicate: that a session associated with the user equipment will be released; and/or that the user equipment will be deregistered with the first network.

The first network function may comprise an access and mobility function or a session management function.

According to a nineteenth aspect, there is provided non-transitory computer readable medium comprising program instructions for causing an apparatus for an unmanned aerial vehicle controller to perform at least the following: control at least one flight path of an unmanned aerial vehicle, the unmanned aerial vehicle being associated with a user equipment configured to maintain connectivity with a first network; receive, from a first network function, a first indication indicating that the user equipment will lose said connectivity to the first network; cause at least one of the user equipment and the unmanned aerial vehicle to be signalled a second indication that the user equipment will lose said connectivity to the first network; and respond to the received first indication by signalling an indication to the first network function to proceed with the connection loss.

Said first indication may comprise at least one of: an identifier of the user equipment; an identifier of the unmanned aerial vehicle; and/or a value for an initial duration of the first timer.

Said first indication may comprise an initial duration of the first timer be extended; and wherein the apparatus may further be caused to: signal, to the first network function, a request to extend the duration of the first timer.

Said signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

The at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

Said first indication may indicate: that a session associated with the user equipment will be released; and/or that the user equipment will be deregistered with the first network.

The first network function may comprise an access and mobility function or a session management function.

According to a twentieth aspect, there is provided non-transitory computer readable medium comprising program instructions for causing an apparatus comprising a user equipment and an unmanned aerial vehicle to perform at least the following: maintain a connection to a first network; receive signalling indicating that the connection to the first network will be lost; and respond to the received signalling with an indication to proceed with the connection loss.

The apparatus may further be caused to cause the unmanned aerial vehicle to change its flight path in response to said signalling and/or for causing the user equipment and/or the unmanned aerial vehicle to perform signalling previously associated with the connectivity being lost using an alternative connection.

The receiving signalling indicating that the connection to the first network will be lost may comprise receiving an indication of an initial time when the first network will proceed with the connection loss.

The responding to the received signalling may comprise requesting that said initial time be delayed to a later time.

According to a twenty first aspect, there is provided a computer program product stored on a medium that may cause an apparatus to perform any method as described herein.

According to a twenty second aspect, there is provided an electronic device that may comprise apparatus as described herein.

According to a twenty third aspect, there is provided a chipset that may comprise an apparatus as described herein.

BRIEF DESCRIPTION OF FIGURES

Examples will now be described, by way of example only, with reference to the accompanying Figures in which:

FIGS. 1A and 1B show a schematic representation of a 5G system;

FIG. 5 shows a schematic representation of a network;

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIGS. 1A and 1B.

Figure 1A:
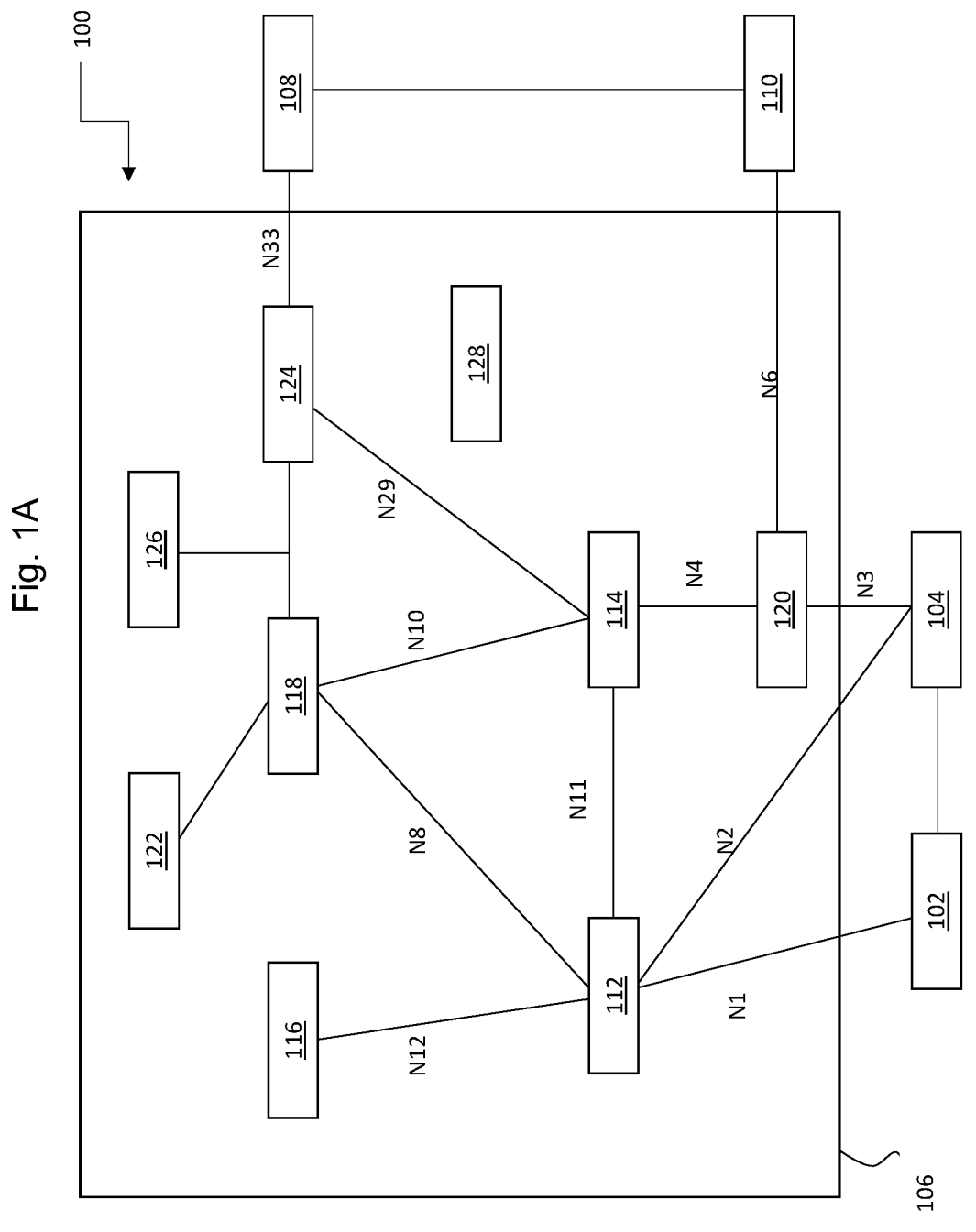

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, etc.) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS). The MDAS may provide data analytics of different network related parameters including for example load level and/or resource utilisation. For example, the MDAS for a network function (NF) can collect the NF's load related performance data, e.g., resource usage status of the NF. The analysis of the collected data may provide forecast of resource usage information in a predefined future time. This analysis may also recommend appropriate actions e.g., scaling of resources, admission control, load balancing of traffic, etc.

FIG. 1B shows a schematic representation of a 5GC 106' represented in current 3GPP specifications.

FIG. 1B shows a UPF 120' connected to an SMF 114' over an N4 interface. The SMF 114' is connected to each of a UDR 122', an NEF 124', an NWDAF 126', an AF 108', a Policy Control Function (PCF) 130', an AMF 112', and a Charging function 132' over an interconnect medium that also connects these network functions to each other.

3GPP refers to a group of organizations that develop and release different standardized communication protocols. 3GPP is currently developing and publishing documents related to Releases 16 to 18, relating to 5G technology.

3GPP Rel-17 TS 23.256 specifies the architecture enhancements for supporting Unmanned Aerial Systems (UAS) connectivity, identification, and tracking, according to the use cases and service requirements defined in 3GPP TS 22.125.

Unmanned Aerial Systems comprise at least one unmanned aerial vehicle (UAV) and an unmanned aerial vehicle controller (UAVc). The UAV controller is a apparatus that is remote from the UAV and is configured to control at least part of the flight path of the UAV. Each of the UAV and UAVc may be associated with a respective separate UE that connects to another network, such as a 3GPP network. The UE is considered "separate" in that it relates to different functionality (i.e. to connect to a different network), and a UAV and its associated UE may in fact be comprised in a single apparatus.

As UAS connectivity may be maintained by a different communication protocol to 3GPP, it is useful to label the UAS network between UAVs as being an aviation network, and to label the connections between UEs associated with those UAVs and the 3GPP network as being a 3GPP network.

As per TS 23.256, at the aviation level, an UAV is identified by a Civil Aviation Administration (CAA)-Level UAV identity (ID). A CAA-level UAV ID uniquely identifies a UAV within at least the scope of a UAS Service Supplier (USS) and/or a UAS Traffic Management (UTM) function.

In contrast, at the 3GPP level, a UE that is used as a UAV (e.g. an aerial UE) is identified using an aerial indication at a user subscription level.

In addition to a primary UE authentication/authorization, the 3GPP system may further perform an authentication and/or authorization of the UAV identity (e.g. the CAA-Level UAV ID) using a UAS Service Supplier (USS) and/or a UAS Traffic Management (UTM) before allowing any UAS services to be provided to the aerial UE via the 3GPP network. The authentication/authorization of the CAA-Level UAV ID may be performed during 5GS Registration and/or during 5G PDU session establishment and/or during LTE/Enhanced Packet Core (EPC) packet data network (PDN) connection establishment. The UE associated with a particular UAV may be configured to always comprise the CAA-Level UAV ID of the UAV in Registration requests and in PDU session establishment requests.

Assuming that a UE comprised in a UAV has registered into the 3GPP network and has established user plane connectivity after a successful UAV authentication/authorization procedure (as described in TS 23.256), the UAV may proceed with a flight mission, using a cellular connectivity (e.g., a Protocol Data Unit (PDU) session) for command and control (C2) communication with a UAV controller.

In such a case, the UAV may use the same PDU session or a different PDU session for communicating with at least one of the USS and/or the UTM through the 3GPP network. This communication may be useful for, for example, providing a Networked Remote ID or Telemetry, etc. The Networked Remote ID is comprised in a remote identification message sent by the UAV to USS. The Networked Remote ID signalling may comprise information that may be usefule for, for example, UAV tracking and/or traffic management, etc. The Network Remote ID signalling may comprise at least one identity of the UAV, a current location of the UAV, and/or a currently location of the controller of the UAV. From a safe UAS operation point of view, the 3GPP connectivity (PDU session) used for C2 or Networked Remote ID etc. are critical for safe operation of the UAV, and therefore needs to be extremely reliable.

There are also ongoing discussions of defining a UAS model where the UAV controller can use 3GPP connectivity and identified uniquely as a UAV controller at the USS and also at 3GPP UE subscription level. In this case, the PDU session used by the UE in the UAV controller can also be considered very critical for safe UAS operation for minimizing the risk of collisions.

During such ongoing UAS operation scenarios, there will be serious consequences for safety implications when the connectivity is abruptly broken. For example, when the connectivity is broken, the UAV controller will no longer be able to control the UAV anymore or the USS may not be able to perform functionalities like DAA (Detect and Avoid) operations, which may lead to collisions with another apparatus. Similar concern has been also raised by stakeholders from the aviation community at different meetings. This has led them to conclude that 3GPP does not abruptly disconnect communication channels used by a UAV for C2 communication, and/or Remote ID, and/or Telemetry, etc.

The UE connectivity (e.g., for a UAV or a UAV controller) may be broken due to various reasons.

For example, the network may initiate UE deregistration for at least one of a plurality of reasons, including a change in UE subscription or subscription removal, UE mobility, etc. This deregistration may lead to the UE connectivity being broken.

As another example, the network may request PDU session release in response to at least one trigger being received. The trigger may be received in response to at least one of a change in subscription data, and/or other network events related to, for example, a network slice specific authentication and authorization (NSSAA) reauthentication and/or revocation, and/or some other event.

A mechanism is needed using which the 3GPP network can assure safe grounding of the UAV before de-registering the UE or before the User Plane connectivity of the UE is released.

In particular, it would be useful to enhance mechanisms related to at least one of network-initiated UE de-registration procedure at the AMF and network requested PDU session release procedure at the SMF in order to support a mechanism to send indication of service termination.

These mechanisms may result in capability changes at both a UE-side and at a network-side. These are considered separately in the below.

First, new capabilities at the UE-side will be considered. At least one of these new UE capabilities may be performed by a UE co-located with a UAV. At least one of these new UE capabilities may be performed by a UE co-located with a UAV controller.

At the UE side, the UE may receive at least one new parameter from AMF and/or SMF, indicating that a service being provided to the UE will be terminated. For example, these parameters may indicate that the UE will be deregistered, and/or that the session will be terminated), so that UAV can take action immediately. The session being released may be a PDU session. These parameters may be as indicated below in Tables 1 and Table 2.

TABLE 1

| AMF parameters<br>Parameters in NAS message from AMF |
|---|
| UE De-registration triggered<br>Instruction: service termination<br>Timer information |

TABLE 2

| SMF parameters<br>Parameters in N1 SM container from SME |
|---|
| PDU session termination triggered;<br>(PDU session Id, DNN, S-NSSAI)<br>Instruction: service termination<br>Timer information |

The UE may respond to the AMF and/or the SMF with confirmation that UAV is grounded, and/or provide confirmation for the AMF and/or the SMF to continue with the de-registration or session release procedure.

With respect to the network capability, there is provided new signalling that may be sent by a network function, such as, for example, an AMF and/or an SMF that informs a USS and/or an application function that a particular UE will be de-registered and/or that a session release for that UE as been triggered. The session being released may be a PDU session. The new signalling may further instruct the USS and/or the application function to inform the UAV about the de-registration/session release has been triggered and to take at least one appropriate action. The signalling to the USS and/or the application function may be performed via a UAS NF and/or a network exposure function.

In response to receipt of at least part of said signalling, the USS and/or the application function may respond to the network function by providing either a confirmation that some action has been taken by the UAV so that it is safe to terminate the connectivity (e.g., that the UAV has been grounded, or to instruct the network function to await such confirmation from the USS and/or application function before continuing with the de-registration and/or session release procedure). When the confirmation is provided, this may indicate to the network function that the UE can be de-registered and/or the session can be released. The network function may respond to such a confirmation by proceeding with de-registering the UE and/or by releasing the session. The signalling from the USS and/or the application function may be performed via a UAS NF and/or a network exposure function.

There is further provided new signalling from the network function (such as the AMF and/or the SMF) to the UE associated with the UAV controller, when the controller information is known to the 3GPP. This new signalling may inform the UE that de-registration and/or C2 communication-related session release is going to be triggered (i.e., that the UE's connectivity to the network in which that network function is located will soon be lost).

The network function may further signal a UE in the UAV controller to inform the UAV about service termination and to take at least one appropriate action (e.g. grounding the UAV).

FIGS. 6 to 9 provide more detailed examples of how the presently described principles may be implemented in a real-world communication system.

For clarity and brevity, the following will provide these more detailed examples of how the presently described techniques may be implemented in systems in which connectivity of a UE associated with a UAV or UAV controller to a communication network is lost by network-initiated UE de-registration and/or network-requested PDU session release. However, it is understood that these are merely examples, and that the principles of the presently described examples may be applied to other ways in which a UE associated with a UAV loses connectivity with a network in response to a network-controlled procedure being triggered.

Further, for clarity reasons, the below description uses the term UE to refer to a UE used with a UAV and/or used with a UE controller a UAV controller unless specifically mentioned otherwise. It is further assumed that a UE used with an UAV controller may be uniquely identified by the 3GPP network as a controller of a UAV.

Figure 6A:
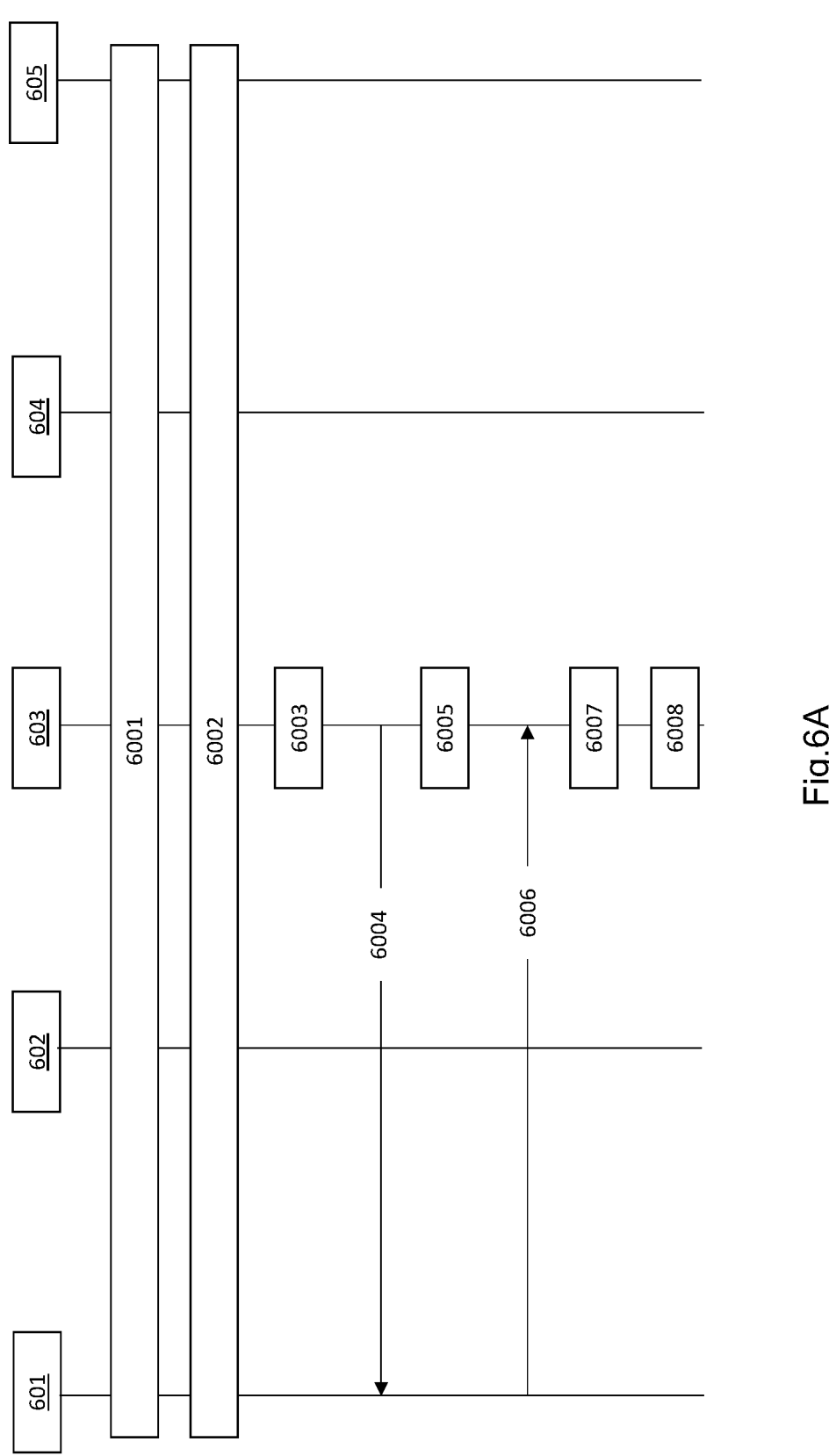
FIGS. 6A to 9B illustrate signalling that may be performed between apparatus described herein in different examples/scenarios.
Figure 6B:
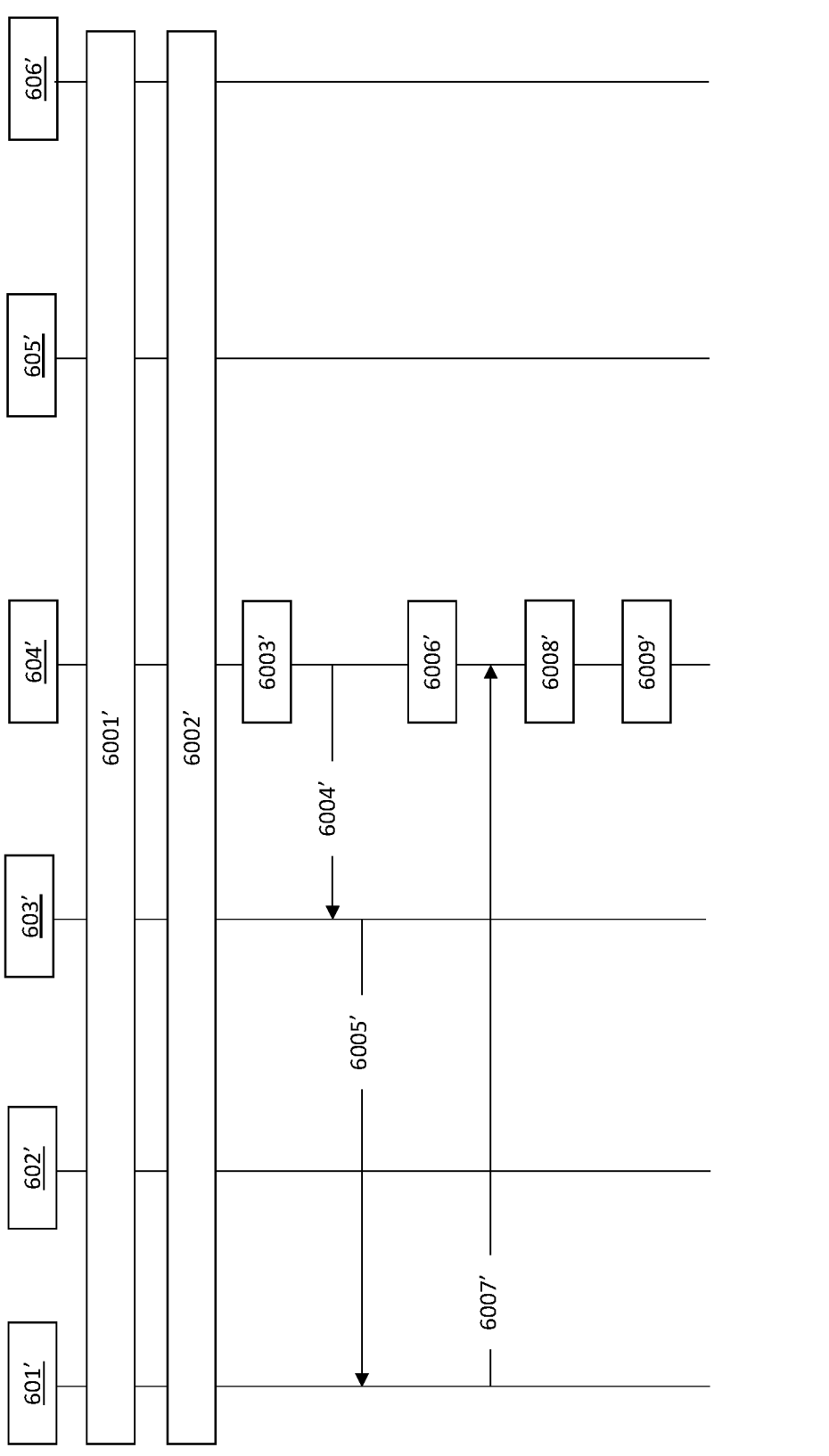

FIGS. 6A and 6B are signalling diagrams that respectively relate to a network-initiated UE de-registration and to a network-requested PDU session release. In these examples, the UE is informed about the UE de-registration or PDU session release being initiated, and UE enhancements are provided to support the receipt of a new indication from the network and to take at least one action in response of this receipt (e.g., ground the UAV or some other action so that network can safely terminate the service).

FIG. 6A illustrates signalling that may be performed between a UE 601, a Radio Access Network (RAN) 602, an AMF 603, a UAS NF/NEF 604 and a USS/UTM 605.

During 6001, the UE 601 is authenticated and/or authorized by the USS/UTM 605 during registration of the UE 601 with a communication network comprising the AMF 603, and/or the UE 601 is authenticated and/or authorized by the USS/UTM 605 during PDU session establishment with the network (e.g., as described in 3GPP TS 23.256).

During 6002, the UE 601 establishes a PDU session for UAS communication (e.g., C2 communication, networked RID communications, Telemetry, etc.).

During 6003, the AMF 603 determines that there has been a network-initiated UE de-registration triggered towards UE 601. This may be as described, for example, in 3GPP 23.502.

In response to the positive determination of 6003, the AMF 603 signals the UE 601 at 6004. This signalling may comprise an indication that connectivity to the network will soon be lost. For example, this signalling may comprise an indication that deregistration of the UE with the network has been triggered. This signalling may be sent using, for example, a non-access stratum message. The signalling of 6004 may also comprise information on a timer, T1, discussed further below. The timing information may be, for example, an indication of a length/duration of the timer, T1.

At 6005, the AMF 603 starts the timer, T1. The timer, T1, may be started when the signalling of 6004 is transmitted by the AMF 603. The timer, T1, has a duration that would cause it to expire at 6007 (although it is understood that the timer, T1, may be stopped before this time).

Signalling may be received by the AMF 603 from the UE 601 during 6006 (while the timer, T1 is running). This signalling of 6006 may indicate that it is safe for the UE to be deregistered. This signalling of 6006 may be sent when the UE 601 has taken at least one action in response to the signalling of 6004 (e.g., to land the associated UAV and/or an action for ensuring that the UAV can be still controlled by the UAV controller (for example, using an alternative connectivity)). When the UE 601 has not taken at least one action in response to the signalling of 6005, the signalling of 6006 and the AMF's response to such signalling is not performed. The timer, T1, may further be reset and/or extended in duration in response to receipt of signalling from the UE 601 requesting further time before the connectivity is lost.

The AMF 603 may respond to the signalling of 6006 by proceeding with the deregistration of the UE 601. When the signalling of 6006 is received while the timer, T1, is running, the AMF 603 may proceed with the deregistration without waiting for the timer, T1, to expire at its scheduled time at 6007.

When the AMF 603 has not received signalling from the UE during 6006 (i.e., before the timer, T1 has expired), the AMF may proceed with the de-registration of the UE after the timer, T1, has expired at 6007. For example, the AMF may proceed with the deregistration of the UE in response to the timer, T1, expiring. The deregistration in this case is represented by 6008. The deregistration may be as described in TS 23.502 for network-initiated UE deregistration.

The operations performed by the UE in respect of FIG. 6A may further be performed by a UE used with a UAV controller.

FIG. 6B illustrates signalling that may be performed between a UE 601', a Radio Access Network (RAN) 602', an AMF 603', an SMF 604', a UAS NF/NEF 605' and a USS/UTM 606'.

During 6001', the UE 601' is authenticated and/or authorized by the USS/UTM 606' during registration of the UE 601' with a communication network comprising the AMF 603', and/or the UE 601' is authenticated and/or authorized by the USS/UTM 606' during PDU session establishment with the network (e.g. as described in 3GPP TS 23.256).

During 6002', the UE 601' establishes a PDU session for UAS communication (e.g. C2 communication, networked RID communications, Telemetry, etc.).

During 6003', the SMF 604' determines that there has been a network-requested PDU session release triggered towards the UE 601'. This may be as described, for example, in 3GPP 23.502.

In response to the positive determination of 6003', the SMF 604' signals AMF 603' at 6004' to indicate that connectivity of the UE 601' with the network will be stopped in the near future. For example, the signalling of 6004' may indicate that a trigger has been received for releasing the PDU session for the UE 601'. This signalling may be comprised in, for example, an Namf_Communication_N1N2MessageTransfer message. This signalling may comprise at least one identifier for identifying the session, and/or at least one identifier for identifying the domain or subdomain to which the session relates (e.g. a data network name and/or a network single slice assistance information). The signalling of 6004' may comprise instructions for the AMF 603' to inform the UAV associated with the UE 601'. This instruction may be provided implicitly by the indication that connectivity of the UE 601' with the network will be stopped in the near future. This instruction may be provided explicitly (e.g., via a specific field and/or bit in the signalling of 6004').

In response to receipt of the signalling of 6004', the AMF 603' signals the UE 601' at 6005'. This signalling may comprise an indication that connectivity to the network will soon be lost. For example, this signalling may comprise an indication that a trigger has been received for releasing the PDU session for the UE 601'. This signalling may be sent using, for example, a non-access stratum message. The signalling of 6005' may also comprise information on a timer, T2, discussed further below. The timing information may be, for example, an indication of a length/duration of the timer, T2.

At 6006', the SMF 604' starts the timer, T2. The timer, T2, may be started when the signalling of 6004' is transmitted by the SMF 604'. The timer, T2, has a duration that would cause it to expire at 6008' (although it is understood that the timer, T2, may be stopped before this time). The timer, T2, may further be reset and/or extended in duration in response to receipt of signalling from the UE 601' requesting further time before the connectivity is lost.

Signalling may be received at the SMF 604' from the UE 601' during 6007' (while the timer, T2 is running). This signalling may be received at the SMF 604' via the AMF 603'. This signalling of 6007' may indicate that it is safe for the UE to be disconnected. This signalling of 6007' may be sent when the UE 601' has taken at least one action in response to the signalling of 6005' (e.g. to land the associated UAV and/or to perform an action for ensuring that the UAV can be still controlled by the UAV controller (for example, using an alternative connectivity)). When the UE 601' has not taken at least one action in response to the signalling of 6005', the signalling of 6007' and the SMF's response to such signalling is not performed.

The SMF 604' may respond to the signalling of 6007' by proceeding with the disconnection of the UE 601'. When the signalling of 6007' is received while the timer, T2, is running, the SMF 604 may proceed with the disconnection without waiting for the timer, T2, to expire at its scheduled time at 6008.

When the SMF 604' has not received signalling from the UE during 6007' (i.e., before the timer, T2, has expired), the SMF 604' may proceed with the PDU session release of the UE after the timer, T2, has expired at 6008'. For example, the SMF may proceed with the PDU session release of the UE in response to the timer, T2, expiring. The PDU session release in this case is represented by 6009'. The PDU session release may be as described in TS 23.502 for network requested PDU session release procedure.

The operations performed by the UE in respect of FIG. 6B may further be performed by a UE used with a UAV controller.

Figure 7A:
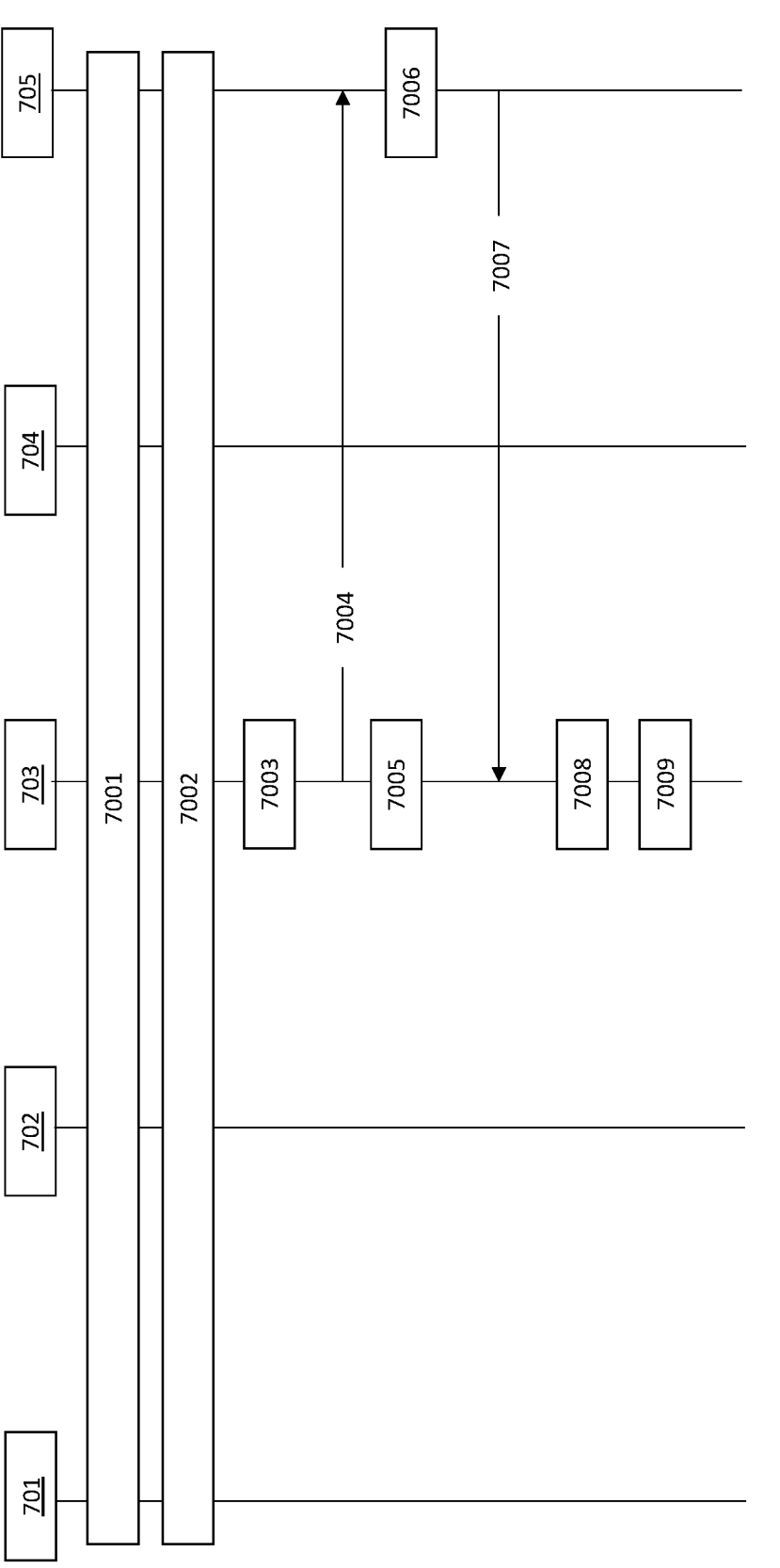
Figure 7B:
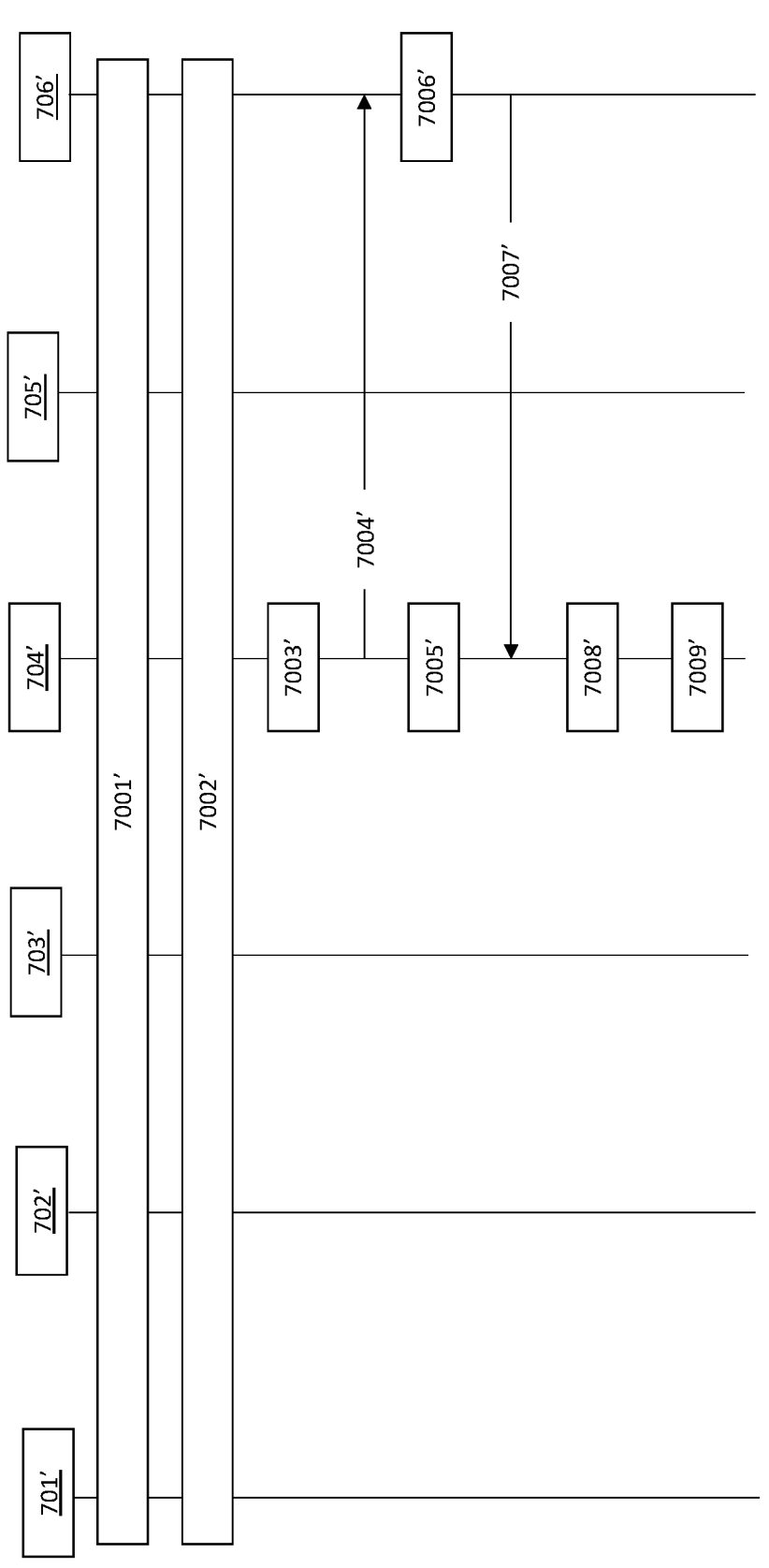

FIGS. 7A and 7B are signalling diagrams that respectively relate to a network-initiated UE de-registration and to a network-requested PDU session release. In these examples, the USS/UTM or an AF is informed by the 3GPP network about the UE de-registration or PDU session release being initiated. The USS/UTM or the AF may then co-ordinates with the UAS operator or UAV controller to take action (e.g., to ground the UAV immediately or some other action so that network can safely terminate the service) and inform the 3GPP network accordingly.

As mentioned above, the 3GPP core network functions may treat the USS/UTM functionalitieis as an application function. When the signalling is between the 3GPP core and a USS/UTM, the USS/UTM may coordinate an action of the UAV associated with the UE with the UAS operator and/or the UAC controller. When the signalling is between an application function of the UAS operator, then the UAS operator may cause an action for the UAV associated with the UE. However, in both cases, from the point of view of the 3GPP network, this signalling of the USS/UTM/AF appears to be happening with an application function outside of the 3GPP boundary. Consequently, throughout the present description, the USS/UTM may be treated as, and/or be considered to function as an application function in the core network function. Further, the operations described in the present application in relation to the USS/UTM may be performed by an application function configured to interface with the UAV system.

FIG. 7A illustrates signalling that may be performed between a UE 701, a Radio Access Network (RAN) 702, an AMF 703, a UAS NF/NEF 704 and a USS/UTM 705.

During 7001, the UE 701 is authenticated and/or authorized by the USS/UTM 705 during registration of the UE 701 with a communication network comprising the AMF 703, and/or the UE 701 is authenticated and/or authorized by the USS/UTM 705 during PDU session establishment with the network (e.g., as described in 3GPP TS 23.256).

During 7002, the UE 701 establishes a PDU session for UAS communication (e.g. C2 communication, networked RID communications, Telemetry, etc.).

During 7003, the AMF 703 determines that there has been a network-initiated UE de-registration triggered towards UE 701. This may be as described, for example, in 3GPP TS 23.502.

In response to the positive determination of 7003, the AMF 703 signals the USS/UTM or AF 705 at 7004 via the UAS NF/NEF 704. This signalling may comprise an indication that connectivity to the network will soon be lost. For example, this signalling may comprise an indication that deregistration of the UE with the network has been triggered. This signalling of 7004 may comprise a service-based interface (SBI) message to the USS/UTM 705.

The signalling of 7004 may comprise an identifier for the UE. The identifier may be a unique identifier for the UE 701. For example, the identifier may be a Generic Public Subscription Identifier (GPSI).

When the AMF 703 comprises an identifier for the UAV associated with the UE 701, the signalling of 7004 may comprise an identifier for the UAV associated with the UE 701. For example, the identifier may be a CAA-Level UAV ID. The CAA-Level UAV ID may also be inserted by the UAS NF/NEF 704 while forwarding the message from the AMF 703 to the USS/UTM 705.

The signalling of 7004 may also comprise information on a timer, T3, discussed further below. The timing information may be, for example, an indication of a length/duration of the timer, T3.

At 7005, the AMF 703 starts the timer, T3. The timer, T3, may be started when the signalling of 7004 is transmitted by the AMF 703. The timer, T3, has a duration that would cause it to expire at 7008 (although it is understood that the timer, T3, may be stopped before this time). The timer, T3, may further be reset and/or extended in duration in response to receipt of signalling from the USS/UTM 705 requesting further time before the connectivity is lost.

In response to receipt of this signalling at 7004, at 7006, the USS/UTM may interact with a UAS operator or UAV controller to instruct the UAS operator or an UAV controller of the associated UAV to cause the UE associated UAV to take an appropriate action, such as to land the associated UAV.

At 7007, the AMF 703 receives signalling from USS/UTM 705 (while the timer, T3 is running). This signalling of 7007 may indicate that it is safe for the UE to be deregistered. This signalling of 7007 may be sent when the UAV associated with the UE 701 has taken at least one action in response to the interaction of 7006 (e.g. to land the associated UAV and/or to perform an action for ensuring that the UAV can still be controlled by the UAV controller (for example, using an alternative connectivity)). The AMF 703 may respond to the signalling of 7006 by proceeding with the deregistration of the UE 701. When the signalling of 7007 is received while the timer, T3, is running, the AMF 703 may proceed with the deregistration without waiting for the timer, T3, to expire at its scheduled time at 7008.

When the AMF 703 has not received signalling from the UE during 7007 (i.e., before the timer, T3 has expired), the AMF may proceed with the de-registration of the UE after the timer, T3, has expired at 7008. For example, the AMF 703 may proceed with the deregistration of the UE in response to the timer, T3, expiring. The deregistration in this case is represented by 7009. The deregistration may be as described in TS 23.502 for network-initiated UE deregistration.

The operations performed by the USS/UTM in respect of FIG. 7A may further be performed with an AF. This is illustrated with respect to FIG. 8A.

FIG. 7B illustrates signalling that may be performed between a UE 701', a Radio Access Network (RAN) 702', an AMF 703', an SMF 704', a UAS NF/NEF 705' and a USS/UTM 706'.

During 7001', the UE 701' is authenticated and/or authorized by the USS/UTM 706' during registration of the UE 701 with a communication network comprising the AMF 703', and/or the UE 701' is authenticated and/or authorized by the USS/UTM 706' during PDU session establishment with the network (e.g., as described in 3GPP TS 23.256).

During 7002', the UE 701' establishes a PDU session for UAS communication (e.g. C2 communication, networked RID communications, Telemetry, etc.).

During 7003', the SMF 704' determines that there has been a network requested PDU session release triggered towards UE 701'. This may be as described, for example, in 3GPP TS 23.502.

In response to the positive determination of 7003', the SMF 704' signals the USS/UTM 706' at 7004' via the UAS NF/NEF 705'. This signalling may comprise an indication that connectivity to the network will soon be lost. For example, this signalling may comprise an indication that PDU session release of the UE with the network has been triggered. This signalling of 7004' may comprise a service-based interface (SBI) message to the USS/UTM 706'.

The signalling of 7004' may comprise an identifier for the UE. The identifier may be a unique identifier for the UE 701'. For example, the identifier may be a Generic Public Subscription Identifier (GPSI).

When the SMF 704' comprises an identifier for the UAV associated with the UE 701', the signalling of 7004' may comprise an identifier for the UAV associated with the UE 701'. For example, the identifier may be a CAA-Level UAV ID. The CAA-Level UAV ID may also be inserted by the UAS NF/NEF 704' while forwarding the message from the SMF 704' to the USS/UTM 706'.

The signalling of 7004' may also comprise information on a timer, T4, discussed further below. The timing information may be, for example, an indication of a length/duration of the timer, T4.

At 7005', the SMF 704' starts the timer, T4. The timer, T4, may be started when the signalling of 7004' is transmitted by the SMF 704'. The timer, T4, has a duration that would cause it to expire at 7008' (although it is understood that the timer, T4, may be stopped before this time). The timer, T4, may further be reset and/or extended in duration in response to receipt of signalling from the USS/UTM 706' requesting further time before the connectivity is lost.

In response to receipt of this signalling at 7005', at 7006', the USS/UTM 706' may interact with a UAS operator or UAV controller to instruct the UAS operator or an UAV controller of the associated UAV to cause the UE associated UAV to take an appropriate action, such as to land the associated UAV.

At 7007', the SMF 704' may receive signalling from the USS/UTM 706' (while the timer, T4 is running). This signalling of 7006' may indicate that it is safe for the PDU session for the UE 701' to be released. This signalling of 7007' may be sent when the UAV associated with the UE 701' has taken at least one action in response to the interacting of 7006' (e.g. to land the associated UAV and/or to perform an action for ensuring that the UAV can still be controlled by the UAV controller (for example, using an alternative connectivity)). The SMF 704' may respond to the signalling of 7007' by proceeding with the PDU session release of the UE 701'. When the signalling of 7007' is received while the timer, T4, is running, the SMF 704' may proceed with the PDU session release without waiting for the timer, T4, to expire at its scheduled time at 7008'.

When the SMF 704' has not received signalling from the USS/UTM 706' during 7007' (i.e., before the timer, T4 has expired), the SMF 704' may proceed with the PDU session release of the UE after the timer, T4, has expired at 7008'. For example, the SMF may proceed with the PDU session release of the UE in response to the timer, T4, expiring. The PDU session release in this case is represented by 7009'. The PDU session release may be as described in TS 23.502 in respect of a network-requested PDU session release.

The operations performed by the USS/UTM in respect of FIG. 7B may further be performed with an AF. This is illustrated with respect to FIG. 8B.

Figure 8A:
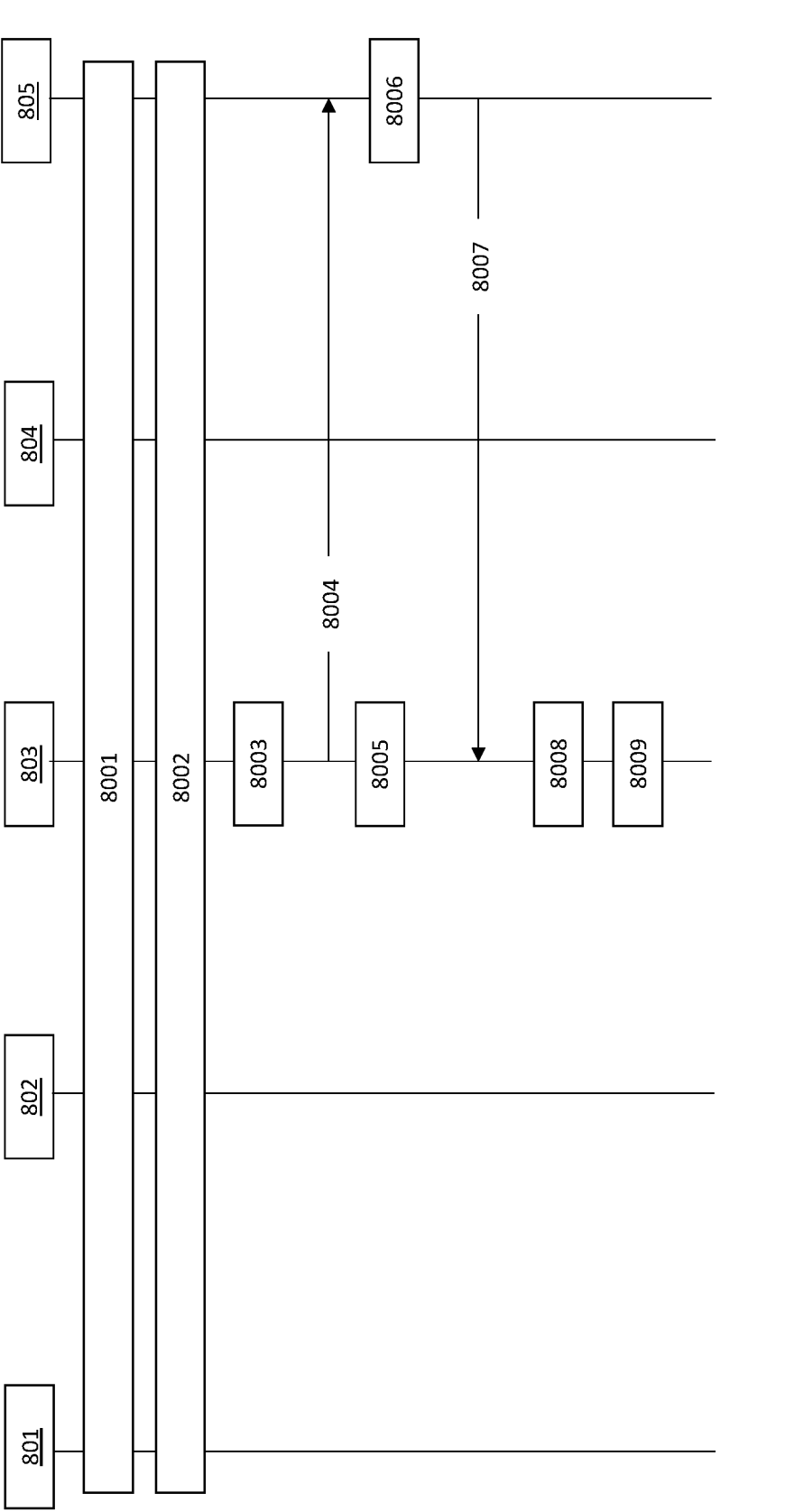
Figure 8B:
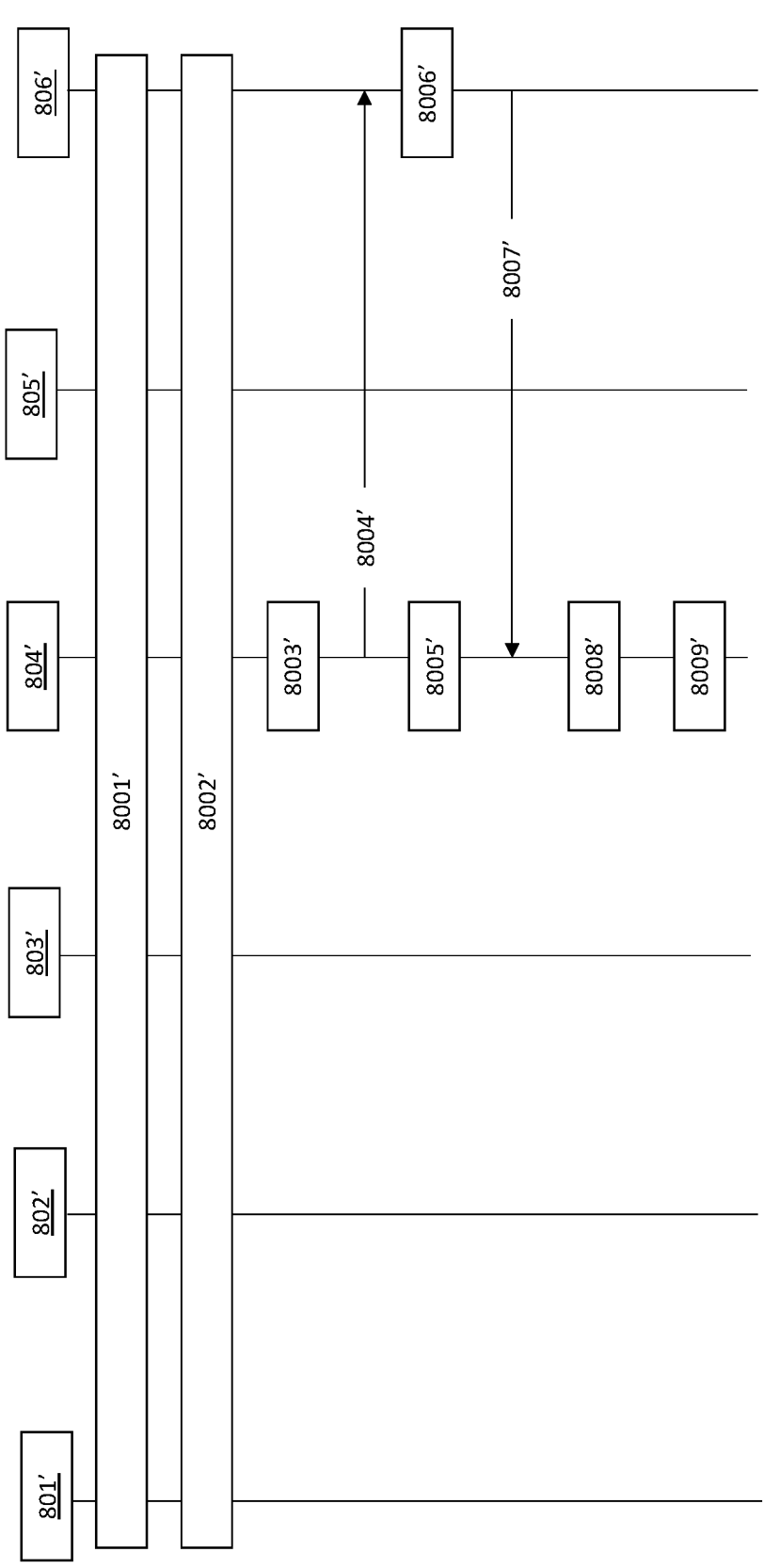

FIGS. 8A and 8B are signalling diagrams that respectively relate to a network-initiated UE de-registration and to a network-requested PDU session release. In these examples, the operations of the USS/UTM with respect to FIGS. 7A and 7B are instead performed by an application function that may belong to an operator of the UAS (e.g. Amazon, Uber, etc.).

FIG. 8A illustrates signalling that may be performed between a UE 801, a Radio Access Network (RAN) 802, an AMF 803, a UAS NF/NEF 804 and an AF 805.

During 8001, the UE 801 is authenticated and/or authorized by the USS/UTM 805 during registration of the UE 801 with a communication network comprising the AMF 803, and/or the UE 801 is authenticated and/or authorized by the USS/UTM 805 during PDU session establishment with the network (e.g., as described in 3GPP TS 23.256).

During 8002, the UE 801 establishes a PDU session for UAS communication (e.g. C2 communication, networked RID communications, Telemetry, etc.).

During 8003, the AMF 803 determines that there has been a network-initiated UE de-registration triggered towards UE 801. This may be as described, for example, in 3GPP TS 23.502.

In response to the positive determination of 8003, the AMF 803 signals the AF 805 at 8004 via the UAS NF/NEF 804. Which AF is signalled may be determined by retrieving information on the AF stored at a UDM function from subscription information stored for the UE 801.

This signalling of 8004 may comprise an indication that connectivity to the network will soon be lost. For example, this signalling may comprise an indication that deregistration of the UE with the network has been triggered. This signalling of 8004 may comprise a service-based interface (SBI) message to the AF 805.

The signalling of 8004 may comprise an identifier for the UE. The identifier may be a unique identifier for the UE 801. For example, the identifier may be a Generic Public Subscription Identifier (GPSI).

When the AMF 803 comprises an identifier for the UAV associated with the UE 801, the signalling of 8004 may comprise an identifier for the UAV associated with the UE 801. For example, the identifier may be a CAA-Level UAV ID. The CAA-Level UAV ID may also be inserted by the UAS NF/NEF 804 while forwarding the message from the AMF 803 to the AF 805.

The signalling of 8004 may also comprise information on a timer, T5, discussed further below. The timing information may be, for example, an indication of a length/duration of the timer, T5.

At 8005, the AMF 803 starts the timer, T5. The timer, T5, may be started when the signalling of 8004 is transmitted by the AMF 803. The timer, T5, has a duration that would cause it to expire at 8008 (although it is understood that the timer, T5, may be stopped before this time). The timer, T5, may further be reset and/or extended in duration in response to receipt of signalling from the AF 805 requesting further time before the connectivity is lost.

In response to receipt of this signalling at 8004, at 8006, the AF 805 may interact with a UAS operator or UAV controller to instruct the UAS operator or an UAV controller of the associated UAV to cause the UE associated UAV to take an appropriate action, such as to land the associated UAV.

At 8007, the AMF 803 receives signalling from the AF 805 (while the timer, T5 is running). This signalling of 8007 may indicate that it is safe for the UE to be deregistered. This signalling of 8007 may be sent when the UAV has taken at least one action in response to the interacting of 8006 (e.g. to land the associated UAV and/or to perform an action for ensuring that the UAV can still be controlled by the UAV controller (for example, using an alternative connectivity)). The AMF 803 may respond to the signalling of 8007 by proceeding with the deregistration of the UE 801. When the signalling of 8007 is received while the timer, T5, is running, the AMF 803 may proceed with the deregistration without waiting for the timer, T5, to expire at its scheduled time at 8008.

When the AMF 803 has not received signalling from the UE during 8007 (i.e., before the timer, T5 has expired), the AMF may proceed with the de-registration of the UE after the timer, T5, has expired at 8008. For example, the AMF may proceed with the deregistration of the UE in response to the timer, T5, expiring. The deregistration in this case is represented by 8009. The deregistration may be as described in TS 23.502 for network-initiated UE deregistration.

FIG. 8B illustrates signalling that may be performed between a UE 801', a Radio Access Network (RAN) 802', an AMF 803', an SMF 804', a UAS NF/NEF 805' and a AF 806'.

During 8001', the UE 801' is authenticated and/or authorized by the USS/UTM 806' during registration of the UE 801' with a communication network comprising the AMF 801', and/or the UE 801' is authenticated and/or authorized by the USS/UTM 806' during PDU session establishment with the network (e.g., as described in 3GPP TS 23.256).

During 8002', the UE 801' establishes a PDU session for UAS communication (e.g. C2 communication, networked RID communications, Telemetry, etc.).

During 8003', the SMF 804' determines that there has been a network requested PDU session release triggered towards UE 801'. This may be as described, for example, in 3GPP TS 23.502.

In response to the positive determination of 8003', the SMF 804' signals the AF 806' at 8004' via the UAS NF/NEF 805'. Which AF is signalled may be determined by retrieving information on the AF stored at a UDM function from subscription information stored for the UE 801'. This signalling of 8004' may comprise an indication that connectivity to the network will soon be lost. For example, this signalling may comprise an indication that PDU session release of the UE with the network has been triggered. This signalling of 8004' may comprise a service-based interface (SBI) message to the AF 806'.

The signalling of 8004' may comprise an identifier for the UE. The identifier may be a unique identifier for the UE 801'. For example, the identifier may be a Generic Public Subscription Identifier (GPSI).

When the SMF 804' comprises an identifier for the UAV associated with the UE 801', the signalling of 8004' may comprise an identifier for the UAV associated with the UE 801'. For example, the identifier may be a CAA-Level UAV ID. The CAA-Level UAV ID may also be inserted by the UAS NF/NEF 804' while forwarding the message from the SMF 804' to the AF 806'.

The signalling of 8004' may also comprise information on a timer, T6, discussed further below. The timing information may be, for example, an indication of a length/duration of the timer, T6.

At 8005', the SMF 804' starts the timer, T6. The timer, T6, may be started when the signalling of 8004' is transmitted by the SMF 804'. The timer, T6, has a duration that would cause it to expire at 8008' (although it is understood that the timer, T6, may be stopped before this time). The timer, T6, may further be reset and/or extended in duration in response to receipt of signalling from the AF 806' requesting further time before the connectivity is lost.

In response to receipt of this signalling at 8004', at 8006', the AF 806' may interact with a UAS operator or UAV controller to instruct the UAS operator or an UAV controller of the associated UAV to cause the UE associated UAV to take an appropriate action, such as to land the associated UAV.

At 8007', the SMF 804' receives signalling from the AF 806' (while the timer, T6 is running). This signalling of 8007' may indicate that it is safe for the UE to be deregistered. This signalling of 8007' may be sent when the UAV has taken at least one action in response to the instructing of 8006' (e.g. to land the associated UAV and/or to take an action for ensuring that the UAV can still be controlled by the UAV controller (for example, using an alternative connectivity)). The SMF 804' may respond to the signalling of 8007' by proceeding with the PDU session release of the UE 801'. When the signalling of 8007' is received while the timer, T6, is running, the SMF 804' may proceed with the PDU session release without waiting for the timer, T6, to expire at its scheduled time at 8008'.

When the SMF 804' has not received signalling from the AF 806' during 8007' (i.e., before the timer, T6 has expired), the SMF may proceed with the PDU session release of the UE after the timer, T6, has expired at 8008'. For example, the SMF may proceed with the PDU session release of the UE in response to the timer, T6, expiring. The PDU session release in this case is represented by 8009'. The PDU session release may be as described in TS 23.502 in respect of a network-requested PDU session release.

Figure 9A:
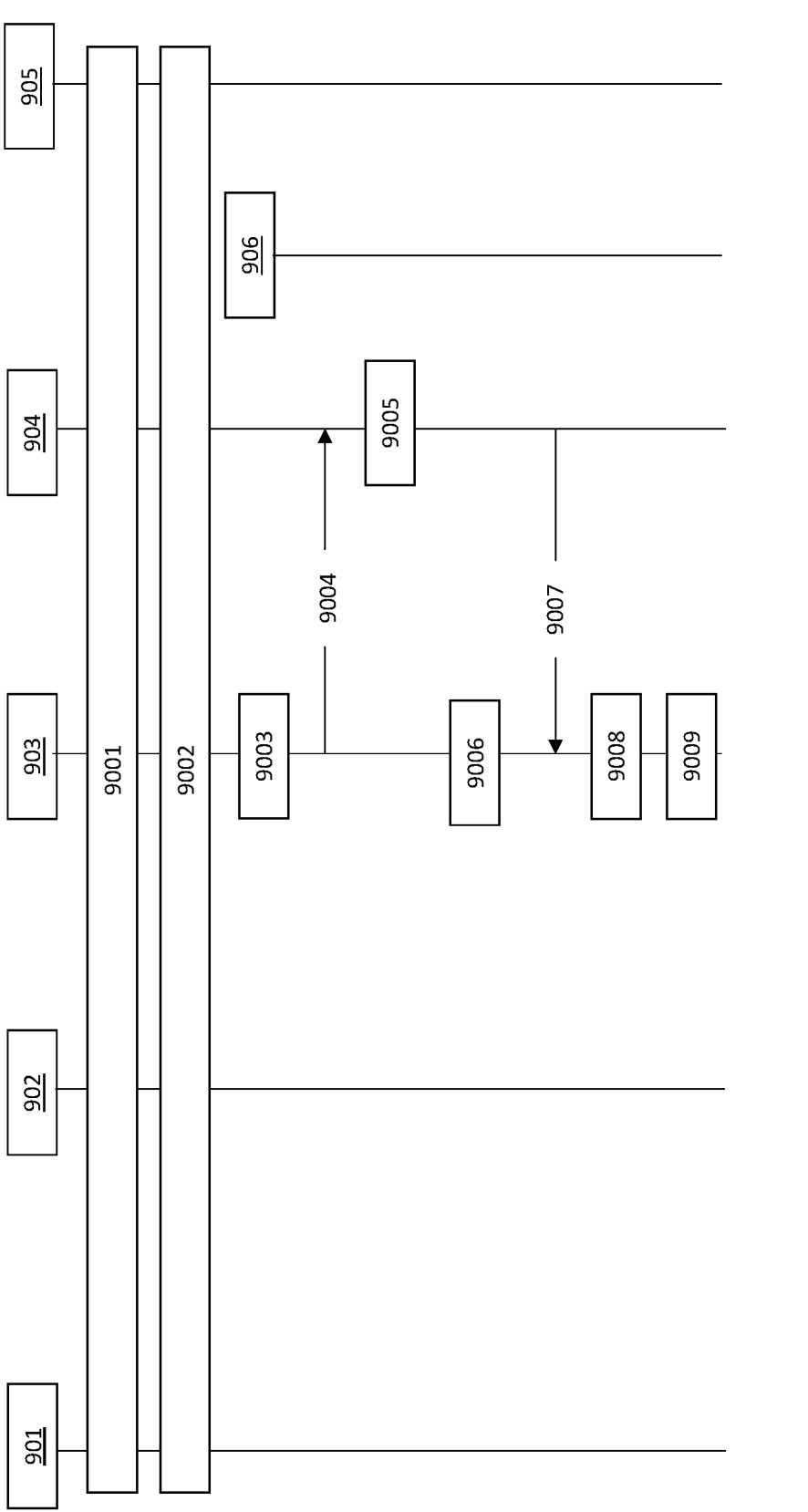
Figure 9B:
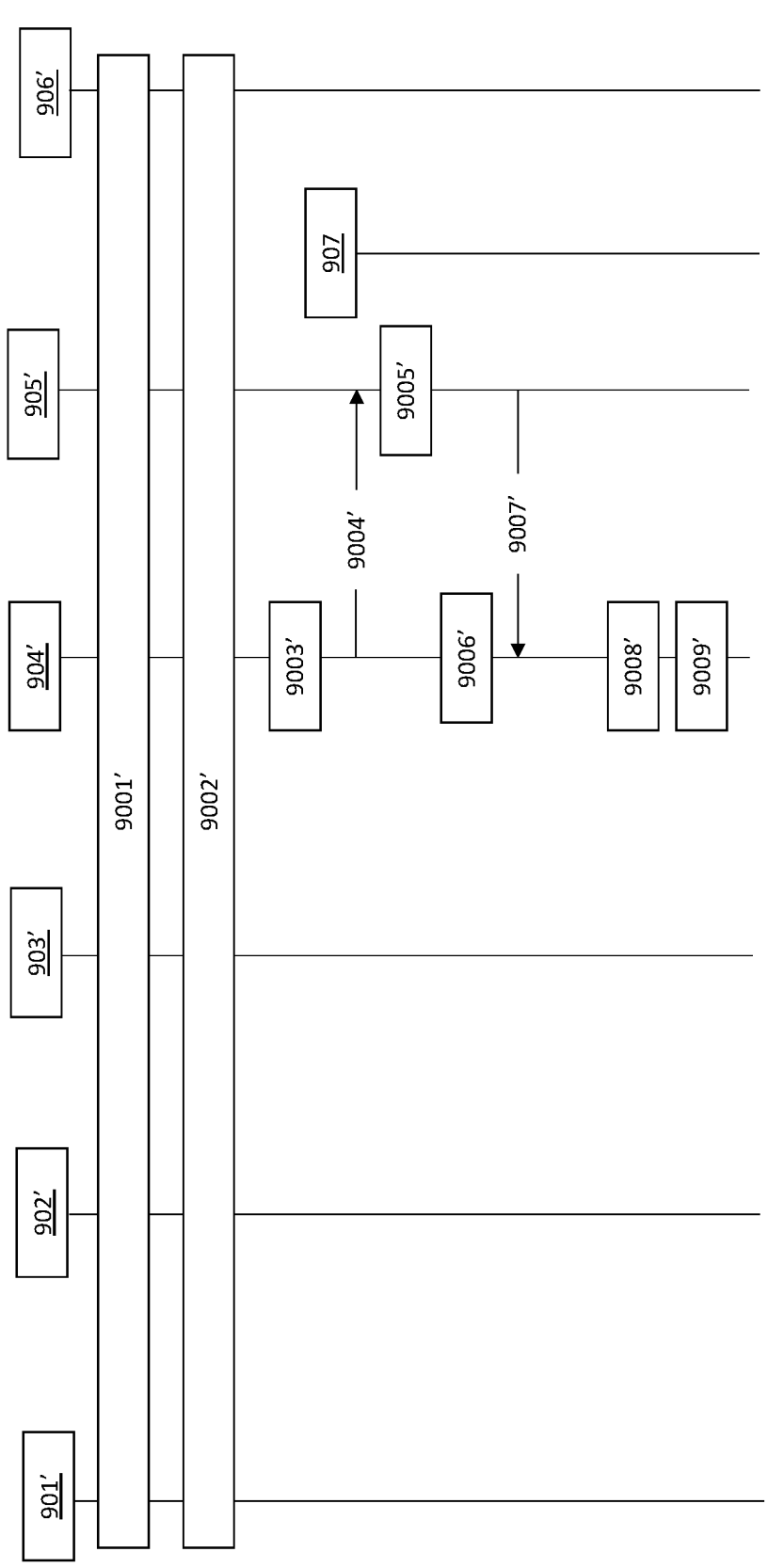

In the examples of FIGS. 9A and 9B, the network in which the AMF/SMF is located maintains pairing information for UAV and UAV controllers and provides the information about the imminent loss of UE connectivity to the 3GPP network to a UAV controller directly. In other words, an AMF/SMF may instruct an NEF to find an AMF serving the UAV controller, before forwarding the loss of connectivity notification to that found AMF serving the UE in the UAV controller. The AMF serving the UE in UAV controller may then can trigger NAS message exchange with the UE in the UAV controller to deliver the information to the UE in the UAV whose network connectivity is to be lost so that evasive action may be taken (e.g. the UAV may land).

FIG. 9A illustrates signalling that may be performed between a UE 901, a Radio Access Network (RAN) 902, an AMF 903, an NEF 904, an AF 905, and a UE used with the UAV controller 906.

During 9001, the UE 901 is authenticated and/or authorized by a USS/UTM (not shown) during registration of the UE 901 with a communication network comprising the AMF 903, and/or the UE 901 is authenticated and/or authorized by the USS/UTM during PDU session establishment with the network (e.g. as described in 3GPP TS 23.256).

During 9002, the UE 901 establishes a PDU session for UAS communication (e.g. C2 communication, networked RID communications, Telemetry, etc.).

During 9003, the AMF 903 determines that there has been a network-initiated UE de-registration triggered towards UE 901. This may be as described, for example, in 3GPP TS 23.502.

In response to the positive determination of 9003, the AMF 903 signals the NEF 904 at 9004.

This signalling of 9004 may comprise an indication that connectivity to the network will soon be lost. For example, this signalling may comprise an indication that deregistration of the UE with the network has been triggered. This signalling of 9004 may comprise a UAV UE Service status update.

The signalling of 9004 may comprise an identifier for the UE. The identifier may be a unique identifier for the UE 901. For example, the identifier may be a Generic Public Subscription Identifier (GPSI).

When the AMF 903 comprises an identifier for the UAV associated with the UE 901, the signalling of 9004 may comprise an identifier for the UAV associated with the UE 901. For example, the identifier may be a CAA-Level UAV ID.

The signalling of 9004 may also comprise information on a timer, T7, discussed further below. The timing information may be, for example, an indication of a length/duration of the timer, T7.

At 9006, the AMF 903 starts the timer, T7. The timer, T7, may be started when the signalling of 9004 is transmitted by the AMF 903. The timer, T7, has a duration that would cause it to expire at 9008 (although it is understood that the timer, T5, may be stopped before this time). The timer, T7, may further be reset and/or extended in duration in response to receipt of signalling from the NEF 904 requesting further time before the connectivity is lost.

In response to receipt of this signalling at 9004, at 9005, the NEF 904 may discover an AMF serving the UE used with the UAV controller 906, and forward the notification to the UE in the UAV controller 906 via that discovered AMF. Although not shown in FIG. 9A, the UE in the UAV controller 906 may perform at least one action in response to receipt of the notification at the UE 906. For example, the UE may cause the associated UAV to land and/or the UE 906 may perform an action for ensuring that the UAV can still be controlled by the UAV controller (for example, using an alternative connectivity to the network). The UAV controller may confirm back to the network (e.g., the AMF serving the UE in UAV controller) when an appropriate action has been taken. The AMF serving the UAV controller UE may subsequently signal this confirmation to the NEF 905'.

To discover the serving AMF, the NEF 904 may maintain a mapping of UAVs to UAV controller (UE). This mapping information may be provisioned in the 3GPP network via the Operations and Management function. Alternatively or additionally, this mapping information may be maintained at the subscription level (e.g. at UE subscription data in the UDM).

At 9007, the AMF 903 receives signalling from the NEF 904 (while the timer, T7 is running). This signalling of 9007 may indicate that it is safe for the UE to be deregistered. This signalling of 9007 may be sent when the UAV has taken at least one action in response to forwarded signalling of 9005 (e.g. to land the associated UAV and/or to perform an action for ensuring that the UAV can still be controlled by the UAV controller (for example, using an alternative connectivity)). The AMF 903 may respond to the signalling of 9007 by proceeding with the deregistration of the UE 901. When the signalling of 9007 is received while the timer, T7, is running, the AMF 903 may proceed with the deregistration without waiting for the timer, T7, to expire at its scheduled time at 9008.

When the AMF 903 has not received signalling from the NEF 904 during 9007 (i.e., before the timer, T7 has expired), the AMF may proceed with the de-registration of the UE after the timer, T7, has expired at 9008. For example, the AMF may proceed with the deregistration of the UE in response to the timer, T7, expiring. The deregistration in this case is represented by 9009. The deregistration may be as described in TS 23.502 for network-initiated UE deregistration.

FIG. 9B illustrates signalling that may be performed between a UE 901', a Radio Access Network (RAN) 902', an AMF 903', an SMF 904', an NEF 905', an AF 906', and a UE used with the UAV controller 907'.

During 9001', the UE 901' is authenticated and/or authorized by a USS/UTM (not shown) during registration of the UE 901' with a communication network comprising the AMF 903', and/or the UE 901' is authenticated and/or authorized by the USS/UTM during PDU session establishment with the network (e.g. as described in 3GPP TS 23.256).

During 9002', the UE 901' establishes a PDU session for UAS communication (e.g. C2 communication, networked RID communications, Telemetry, etc.).

During 9003', the SMF 904' determines that there has been a network-requested PDU session release triggered towards UE 901'. This may be as described, for example, in 3GPP 23.502.

In response to the positive determination of 9003', the SMF 904' signals the NEF 905' at 9004'.

This signalling of 9004' may comprise an indication that connectivity to the network will soon be lost. For example, this signalling may comprise an indication that PDU session release of the UE with the network has been triggered. This signalling of 9004' may comprise a UAV UE Service status update.

The signalling of 9004' may comprise an identifier for the UE. The identifier may be a unique identifier for the UE 901'. For example, the identifier may be a Generic Public Subscription Identifier (GPSI).

When the SMF 904' comprises an identifier for the UAV associated with the UE 901', the signalling of 9004' may comprise an identifier for the UAV associated with the UE 901'. For example, the identifier may be a CAA-Level UAV ID.

The signalling of 9004' may also comprise information on a timer, T8, discussed further below. The timing information may be, for example, an indication of a length/duration of the timer, T8.

At 9006', the SMF 904' starts the timer, T8. The timer, T8, may be started when the signalling of 9004' is transmitted by the SMF 904'. The timer, T8, has a duration that would cause it to expire at 9008' (although it is understood that the timer, T8, may be stopped before this time). The timer, T8, may further be reset and/or extended in duration in response to receipt of signalling from the NEF 905' requesting further time before the connectivity is lost.

In response to receipt of this signalling at 9004', at 9005', the NEF 904' may discover an AMF serving the UE used with the UAV controller 907', and forward the notification to the UE used with the UAV controller 907' via that discovered AMF. Although not shown in FIG. 9B, the UE in the UAV controller 907' may perform at least one action in response to receipt of the notidication at the UE 907'. For example, the UE 907' may cause the associated UAV to land and/or the UE 907' may perform an action for ensuring that the UAV can still be controlled by the UAV controller (for example, using an alternative connectivity to the network). The UAV controller may confirm back to the network (e.g., the AMF serving the UE in UAV controller) when an appropriate action has been taken. The AMF serving the UAV controller UE may subsequently signal this confirmation to the NEF 905'.

At 9007', the SMF 904' receives signalling from the NEF 905' (while the timer, T8 is running). This signalling of 9007' may indicate that it is safe for the UE to be deregistered. This signalling of 9007' may be sent when the UAV has taken at least one action in response to forwarded signalling of 9005' (e.g. to land the associated UAV and/or to perform an action for ensuring that the UAV can still be controlled by the UAV controller (for example, using an alternative connectivity)). The SMF 904'may respond to the signalling of 9007' by proceeding with the deregistration of the UE 901'. When the signalling of 9007' is received while the timer, T8, is running, the SMF 904'may proceed with the deregistration without waiting for the timer, T8, to expire at its scheduled time at 9008'.

When the SMF 904'has not received signalling from the NEF 905' during 9007' (i.e., before the timer, T8 has expired), the SMF 904' may proceed with releasing the PDU session of the UE 901' after the timer, T8, has expired at 9008'. For example, the SMF 904' may proceed with the deregistration of the UE in response to the timer, T8, expiring. The PDU session release in this case is represented by 9009'. The PDU session release may be as described in TS 23.502 for network-requested PDU session release.

FIGS. 10 to 13 illustrate aspects of the above examples. It is understood that the more general discussion associated with these illustrated examples may be reflected in features of the above examples of FIGS. 6A to 9B.

Figure 10:
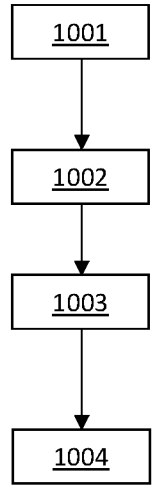
FIGS. 10 to 13 are flow charts illustrating different operations that may be performed by apparatus described herein.

FIG. 10 illustrates operations that may be performed by an apparatus for a first network function located in a first network. The first network may be, for example, a 3GPP network. The first network may be, for example, a 5G and/or a 6G network. The first network may be, for example, a core network part of a 3GPP network.

At 1001, the apparatus determines that a trigger event has occurred for causing a user equipment associated with an unmanned aerial vehicle to lose connectivity to the first network. The user equipment may be associated with the unmanned aerial vehicle in that they form part of the same apparatus. The trigger event may be, for example, a change in subscription data, and/or other network events related to, for example, a network slice specific authentication and authorization (NSSAA) reauthentication and/or revocation, and/or some other event.

At 1002, the apparatus causes at least one of the user equipment and/or the unmanned aerial vehicle and/or an unmanned aerial vehicle controller to be signalled a first indication that the user equipment will lose said connectivity to the first network, wherein the unmanned aerial vehicle controller is configured to control at least one flight path of the unmanned aerial vehicle.

At 1003, the apparatus causes a timer to be initiated in response to causing at least one of the user equipment and/or the unmanned aerial vehicle and/or the unmanned aerial vehicle controller to be signalled. The timer may be associated with and/or maintained by the first network function, and/or the second network function, and/or the user equipment, and/or the unmanned aerial vehicle, and/or the unmanned aerial vehicle controller.

At 1004, the apparatus delays proceeding with causing the user equipment to lose said connectivity to the first network until at least one of the following has occurred: 1) the apparatus receives signalling indicating that the network function may proceed with causing the user equipment to lose connectivity to the first network; and/or 2) the apparatus determines that said first timer has expired. The apparatus may cause the first timer to expire and/or reset in response to detecting that 1) has occurred.

The operation of 1002 may be caused by the apparatus signalling at least one of the user equipment and/or the unmanned aerial vehicle and/or an unmanned aerial vehicle controller to be signalled a first indication by signalling the user equipment using the first network.

The operation of 1002 may be caused by signalling the user equipment indirectly through at least one second network function. The at least one second network function may comprise at least one of: an access and mobility function, a network function, a network exposure function, an application function, an Unmanned Aerial Systems Service Supplier and/or a function associated with the unmanned aerial vehicle.

The causing at least one of the user equipment and/or the unmanned aerial vehicle and/or the unmanned aerial vehicle controller to be signalled a first indication may comprise signalling at least one of: an identifier of the user equipment; an identifier of the unmanned aerial vehicle; and/or a value for an initial duration of the first timer.

Said receiving signalling indicating that the network function may proceed with causing the user equipment to lose connectivity to the first network may comprise: receiving signalling requesting that an initial duration of the first timer be extended; and extending the duration of the first timer to an extended duration.

Said receiving signalling indicating that the network function may proceed with causing the user equipment to lose connectivity to the first network may comprise receiving signalling indicating that the unmanned aerial vehicle has changed its flight path and/or landed on the ground.

Figure 11:
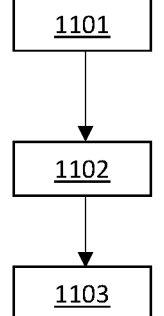

FIG. 11 illustrates operations that may be performed by an apparatus for a second network function. The second network function of FIG. 11 may be configured to interact with the apparatus of FIG. 10. The second network function of FIG. 11 may be the second network function mentioned in connection with FIG. 10. The second network function may comprise at least one of: an access and mobility function, a network function, a network exposure function, an application function, an Unmanned Aerial Systems Service Supplier and/or a function associated with the unmanned aerial vehicle.

At 1101, the apparatus receives, from a first network function located in a first network, a first indication indicating that a user equipment associated with an unmanned aerial vehicle will lose connectivity to the first network.

At 1102, the apparatus causes at least one of the user equipment and the unmanned aerial vehicle to be signalled a second indication that the user equipment will lose said connectivity to the first network.

At 1103, the apparatus responds to the received first indication by signalling an indication to the first network function to proceed with the connection loss.

When the second network function is a network exposure function, the causing at least one of the user equipment and/or the unmanned aerial vehicle and/or the unmanned aerial vehicle controller to be signalled the second indication may comprise: identifying an access and mobility function currently serving the user equipment and/or a user equipment associated with a controller of the unmanned aerial vehicle; and causing the identified access and mobility function to signal the second indication to the user equipment.

Figure 12:
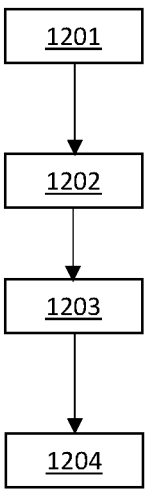

FIG. 12 illustrates operations that may be performed by an apparatus for an unmanned aerial vehicle controller. The unmanned aerial vehicle controller may be configured to interact with the apparatus of at least one of FIGS. 10 and/or 11.

At 1201, the apparatus controls at least one flight path of an unmanned aerial vehicle, the unmanned aerial vehicle being associated with a user equipment configured to maintain connectivity with a first network.

At 1202, the apparatus receives, from a first network function, a first indication indicating that the user equipment will lose said connectivity to the first network. This receiving may be performed via a user equipment comprised with the unmanned aerial vehicle, and/or via a second network corresponding to a network of the unmanned aerial vehicle controller.

At 1203, the apparatus causes at least one of the user equipment and the unmanned aerial vehicle to be signalled a second indication that the user equipment will lose said connectivity to the first network.

At 1204, the apparatus responds to the received first indication by signalling an indication to the first network function to proceed with the connection loss. This signalling may be performed responsive to the signalling of 1203, and/or responsive to receipt of signalling from the user equipment and/or the unmanned aerial vehicle indicating that the signal loss may proceed.

For any of the examples of FIGS. 11 and 12, the first indication may comprise at least one of: an identifier of the user equipment; an identifier of the unmanned aerial vehicle; and/or a value for an initial duration of the first timer.

For any of the examples of FIGS. 11 and 12, said first indication may comprise an initial duration of the first timer be extended. Each apparatus may signal, to the first network function, a request to extend the duration of the first timer. This request may be signalled in response to a determination that the user equipment and/or the unmanned aerial vehicle needs more time to perform a mitigating action against the loss of connectivity.

In any of the examples of FIGS. 11 and 12, the signalling an indication to proceed with the connection loss may comprise: receiving a third indication that the unmanned aerial vehicle and/or the user equipment has taken at least one action in response to being notified of the loss of connectivity; and signalling a fourth indication that the unmanned aerial vehicle and/or the user equipment has performed said at least one action.

For any of the examples of FIGS. 10 to 12, the at least one action may be at least one of: the unmanned aerial vehicle has changed its flight path in response to being notified of the loss of connectivity, and/or that the user equipment and/or the unmanned aerial vehicle will perform signalling previously associated with the connectivity being lost using an alternative connection.

For any of the examples of FIGS. 10 to 12, said first indication may indicate: that a session associated with the user equipment will be released; and/or that the user equipment will be deregistered with the first network.

For any of the examples of FIGS. 10 to 12, first network function comprise may comprise an access and mobility function or a session management function.

Figure 13:
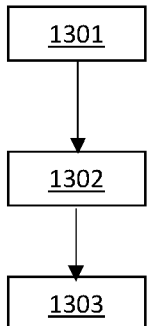

FIG. 13 illustrates operations that may be performed by an apparatus comprising a user equipment and an unmanned aerial vehicle. This apparatus of FIG. 13 may be configured to interact with any of the apparatus of FIGS. 10 to 12. The user equipment and/or the unmanned aerial vehicle of FIG. 13 may correspond to the user equipment and/or unmanned aerial vehicle mentioned in any of FIGS. 10 to 12.

At 1301, the apparatus maintains a connection to a first network. The first network may be as discussed above in respect of any of FIGS. 10 to 12.

At 1302, the apparatus receives signalling indicating that the connection to the first network will be lost. The signalling may be received from a first network function (e.g., as described above with respect to FIG. 10), via a second network function (e.g., as described above with respect to FIG. 11), and/or via an unmanned aerial vehicle controller of the unmanned aerial vehicle (e.g., as described above with respect to FIG. 12).

At 1303, the apparatus responds to the received signalling with an indication to proceed with the connection loss.

The apparatus may cause the unmanned aerial vehicle to change its flight path in response to said signalling and/or cause the user equipment and/or the unmanned aerial vehicle to perform signalling previously associated with the connectivity being lost using an alternative connection.

The receiving signalling indicating that the connection to the first network will be lost may comprise receiving an indication of an initial time when the first network will proceed with the connection loss. The responding to the received signalling may comprise signalling a request that said initial time be delayed to a later time. The connection to the first network may be lost at the initial time. The connection to the first network may be lost at the later time (when requested).

It is understood that references throughout the present application to entities that "interface" with other entities may also be read as those entities allowing direct signalling to be performed in at least one direction between the interfacing entities. In other words, if entity A and entity B each interface with entity C while entity A and B do not interface with each other, then direct signalling in at least one direction may be performed between entity A and entity C and between entity B and entity C, and direct signalling may not be performed between entity A and entity B.

Figure 2:
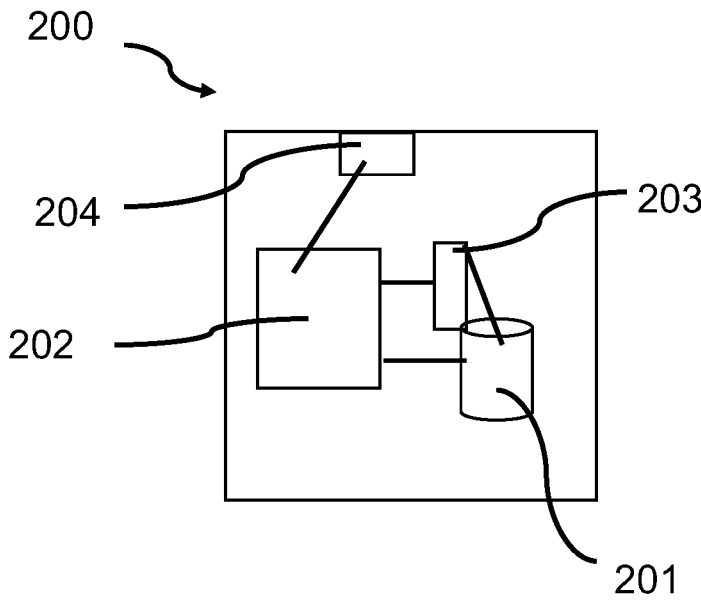
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
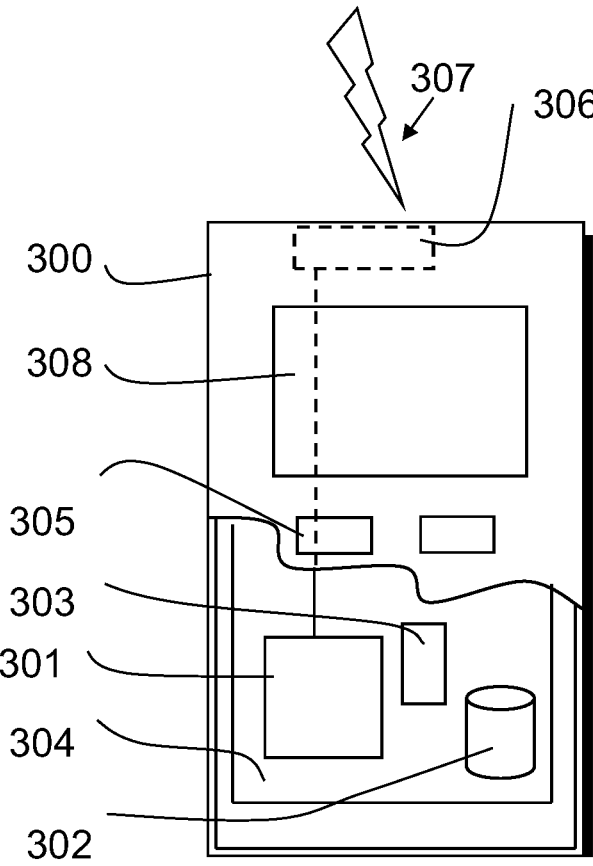
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
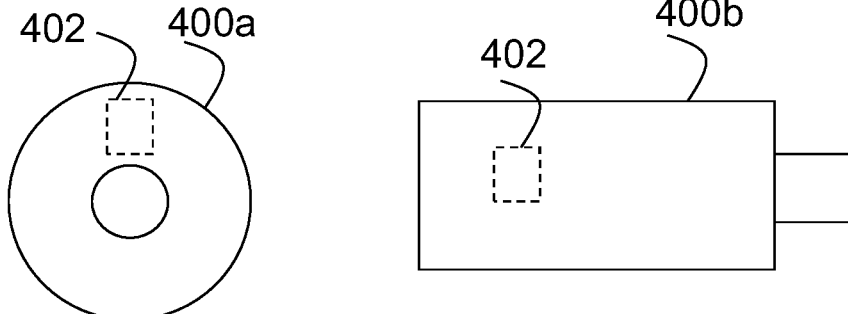
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10 and/or FIG. 11 and/or FIG. 12, and/or FIG. 13.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10 and/or FIG. 11 and/or FIG. 12, and/or FIG. 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

In the above, different examples are described using, as an example of an access architecture to which the presently described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technol-ogy, sensor networks, mobile ad-hoc networks (MANETs) and Internet Protocol multimedia subsystems (IMS) or any combination thereof.

Figure 5:
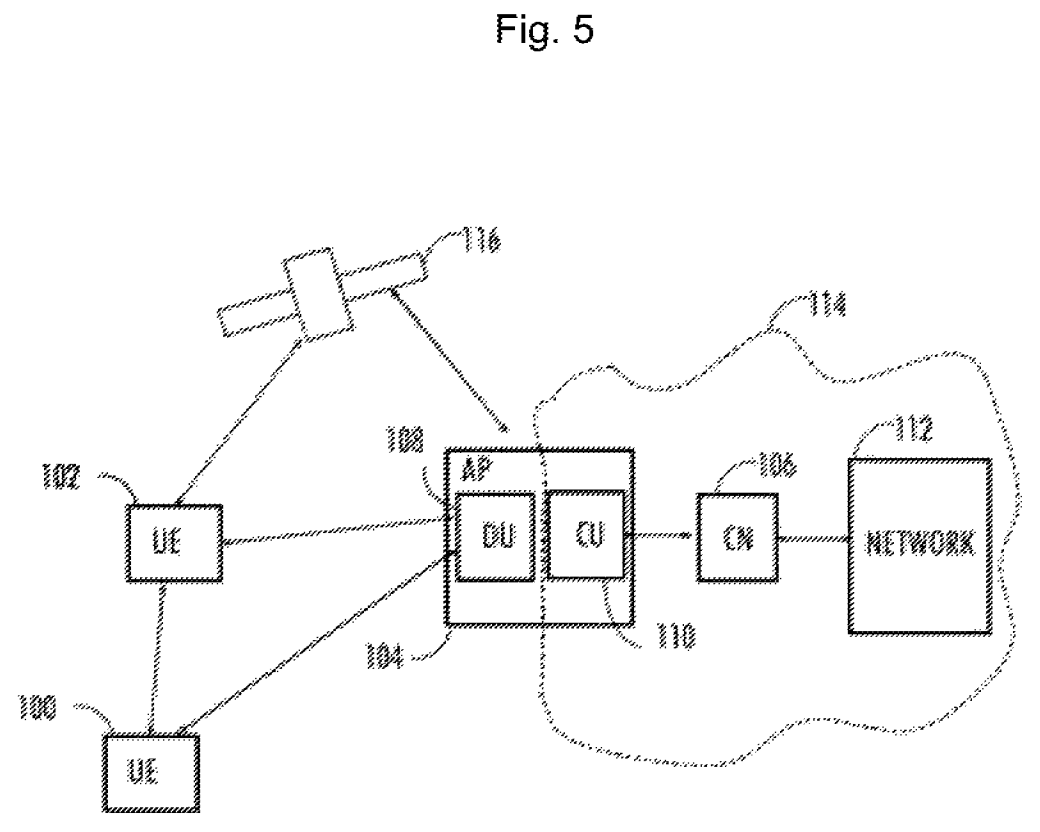

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g) NodeB serving devices in a cell. In one example, the node 504 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 506 (CN or next generation core NGC). Depending on the deployed technology, the (e/g) NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHZ-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network.

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

The invention claimed is:

1. An apparatus comprising:
at least one processor; and
at least one memory storing instructions which, when executed by the at least one processor, cause the apparatus at least to:
determine that a trigger event has occurred for causing a user equipment associated with an unmanned aerial vehicle to lose connectivity to a network;
transmit, based on a determination that the trigger event has occurred, to at least one of: the user equipment, the unmanned aerial vehicle, or an unmanned aerial vehicle controller of the unmanned aerial vehicle that is configured to control the unmanned aerial vehicle, an indication that the user equipment will lose said connectivity to the network;
initiate a timer in response to the transmitting of the indication; and
delay proceeding with causing the at least one of the user equipment, the unmanned aerial vehicle, or the unmanned aerial vehicle controller to lose said connectivity to the network until at least one of the following has occurred:
receipt of a signal authorizing the at least one of the user equipment, the unmanned aerial vehicle, or the unmanned aerial vehicle controller to lose the connectivity to the network, or a determination that said timer has expired.

2. The apparatus as claimed in claim 1, wherein the instructions, when executed by the at least one processor, cause the apparatus to transmit the indication to the at least one of: the user equipment, the unmanned aerial vehicle, or the unmanned aerial vehicle controller, using the network.

3. The apparatus as claimed in claim 1, wherein the instructions, when executed by the at least one processor, cause the apparatus to;
transmit the indication to the user equipment indirectly through at least one network function.

4. The apparatus as claimed in claim 3, wherein the at least one network function comprises at least one of: an access and mobility function of the network, a network exposure function of the network, an application function, a function of an unmanned aerial systems service supplier, or a function associated with the unmanned aerial vehicle.

5. The apparatus as claimed in claim 1, wherein the indication includes at least one of: an identifier of the user equipment; an identifier of the unmanned aerial vehicle; or a value for an initial duration of the timer.

6. The apparatus as claimed in claim 1, wherein the instructions, when executed by the at least one processor, cause the apparatus to:
receive a request to extend an initial duration of the timer; and
extend, based on the request to extend, the timer to an extended duration.

7. The apparatus as claimed in claim 1, wherein the instructions, when executed by the at least one processor, cause the apparatus to:
receive an indication indicating that the unmanned aerial vehicle has changed a flight path of the unmanned aerial vehicle or has landed on the ground.

8. An apparatus comprising:
at least one processor; and
at least one memory storing instructions which, when executed by the at least one processor, cause the apparatus at least to:
control a flight path of an unmanned aerial vehicle, the unmanned aerial vehicle being associated with a user equipment configured to maintain connectivity with a network;
receive, from a network function of the network, a first indication indicating that the user equipment will lose said connectivity with the network;
transmit, based on the first indication that was received, to at least one of the user equipment or the unmanned aerial vehicle, a second indication indicating that the user equipment will lose the connectivity with the network;
receive, in response to transmission of the second indication, from the at least one of the unmanned aerial vehicle or the user equipment, a third indication that the at least one of the unmanned aerial vehicle or the user equipment has performed at least one action based on the second indication; and
transmit, based on the third indication that was received, to the network function, in response to the first indication that was received, a fourth indication that the network function is to proceed with an action causing loss of the connectivity.

9. The apparatus as claimed in claim 8, wherein said first indication comprises at least one of: an identifier of the user equipment; an identifier of the unmanned aerial vehicle; or a value indicating an initial duration of a timer.

10. The apparatus as claimed in claim 8, wherein said first indication comprises an initial duration of a timer, and wherein the instructions, when executed by the at least one processor, cause the apparatus to:

transmit, to the network function, a request to extend the initial duration of the timer.

11. The apparatus as claimed in claim 8, wherein the at least one action comprises at least one of: a change of the flight path of the unmanned aerial vehicle, or acknowledgement that the at least one of the user equipment or the unmanned aerial vehicle will perform signalling previously associated with the connectivity that is to be lost, using an alternative connection.

12. An apparatus comprising:

at least one processor; and at least one memory storing instructions which, when executed by the at least one processor, cause the apparatus at least to:

maintain a connection to a network;

receive signalling indicating that the connection to the network will be lost;

receive an indication of an initial time at which the network will proceed with causing loss of the connection;

request that the initial time be delayed to a later time; and transmit, in response to receipt of an authorization that the initial time be delayed to a later time, an indication to proceed with the loss of the connection.

13. The apparatus as claimed in claim 12, wherein the instructions, when executed by the at least one processor, cause the apparatus to at least one of:

cause a change in a flight path of an unmanned aerial vehicle associated with the apparatus in response to said signalling, or cause at least one of the apparatus or the unmanned aerial vehicle associated with the apparatus to perform the signalling previously associated with the connectivity that is to be lost, using an alternative connection.

14. A method comprising:

determining, by a network function, that a trigger event has occurred for causing a user equipment associated with an unmanned aerial vehicle to lose connectivity to a network;

transmitting, by the network function, based on a determination that the trigger event has occurred, to at least one of: the user equipment, the unmanned aerial vehicle, or an unmanned aerial vehicle controller of the unmanned aerial vehicle that is configured to control the unmanned aerial vehicle, an indication that the user equipment will lose said connectivity to the network;

initiating, by the network function, a timer in response to the transmitting of the indication; and delaying, by the network function, proceeding with causing the at least one of the user equipment, the unmanned aerial vehicle, or the unmanned aerial vehicle controller to lose said connectivity to the network until at least one of the following has occurred:

receipt of a signal authorizing the at least one of the user equipment, the unmanned aerial vehicle, or the unmanned aerial vehicle controller to lose said connectivity to the network; or a determination that said timer has expired.

15. A method comprising:

controlling, by a controller of an unmanned aerial vehicle, a flight path of the unmanned aerial vehicle, the unmanned aerial vehicle being associated with a user equipment configured to maintain connectivity with a network;

receiving, at the controller, from a network function of the network, a first indication indicating that the user equipment will lose said connectivity with the network;

transmitting, by the controller, based on the first indication that was received, to at least one of: the user equipment or the unmanned aerial vehicle, a second indication that the user equipment will lose said connectivity with the network;

receiving, at the controller, response to transmission of the second indication, from the at least one of the unmanned aerial vehicle or the user equipment, a third indication that the at least one of the unmanned aerial vehicle or the user equipment has performed at least one action based on the second indication; and transmitting, by the controller, based on the third indication that was received, to the network function, in response to the first indication that was received, a fourth indication that the network function is to proceed with an action causing loss of the connectivity.

16. A method comprising:

maintaining, by a user equipment, a connection to a network;

receiving, by the user equipment, signalling indicating that the connection to the network will be lost;

receiving, by the user equipment, an indication of an initial time at which the network will proceed with causing loss of the connection;

requesting, by the user equipment, that the initial time be delayed to a later time; and transmitting, by the user equipment, in response to receipt of an authorization that the initial time be delayed to a later time, an indication to proceed with the loss of the connection.

* * * * *